(12) United States Patent
Mitsunaga et al.

(10) Patent No.: US 11,014,275 B2
(45) Date of Patent: May 25, 2021

(54) PRESS MOLDING PRODUCTION METHOD

(71) Applicant: Teijin Limited, Osaka (JP)

(72) Inventors: Masaki Mitsunaga, Osaka (JP); Hodaka Yokomizo, Osaka (JP)

(73) Assignee: Teijin Limited, Osaka (JP)

( * ) Notice: Subject to any disclaimer, the term of this patent is extended or adjusted under 35 U.S.C. 154(b) by 271 days.

(21) Appl. No.: 16/320,888

(22) PCT Filed: Jul. 27, 2017

(86) PCT No.: PCT/JP2017/027285
§ 371 (c)(1),
(2) Date: Jan. 25, 2019

(87) PCT Pub. No.: WO2018/021488
PCT Pub. Date: Feb. 1, 2018

(65) Prior Publication Data
US 2019/0160715 A1    May 30, 2019

(30) Foreign Application Priority Data
Jul. 28, 2016    (JP) .............................. JP2016-148626

(51) Int. Cl.
*B29C 43/58*    (2006.01)
*B32B 27/12*    (2006.01)
(Continued)

(52) U.S. Cl.
CPC .............. *B29C 43/58* (2013.01); *B29C 43/52* (2013.01); *B32B 27/12* (2013.01); *B32B 37/10* (2013.01);
(Continued)

(58) Field of Classification Search
CPC . B29C 43/58; B29C 43/52; B29C 2043/5816; B29C 2043/5833; B29C 2043/5808; B32B 27/12; B32B 37/10; B29K 2077/00; B29K 2105/12; B29K 2067/006; B29K 2101/12; B29K 2307/04
(Continued)

(56) References Cited

U.S. PATENT DOCUMENTS

| | | |
|---|---|---|
| 2012/0302118 A1 | 11/2012 | Kasuya et al. |
| 2013/0344282 A1 | 12/2013 | Yagi et al. |
| 2014/0148072 A1 | 5/2014 | Nagakura et al. |

FOREIGN PATENT DOCUMENTS

| | | |
|---|---|---|
| EP | 0335098 A2 | 10/1989 |
| JP | 2013-103481 A | 5/2013 |

(Continued)

OTHER PUBLICATIONS

Oct. 3, 2017—International Search Report—Intl App PCT/JP2017/027285.
Jul. 5, 2019—(EP) European Search Report—App 178344909.

*Primary Examiner* — Linda L Gray
*Assistant Examiner* — Vicki Wu
(74) *Attorney, Agent, or Firm* — Banner & Witcoff, Ltd.

(57) ABSTRACT

Provided is a method for manufacturing a fiber-reinforced resin molded article by cold press molding a fiber-reinforced resin material including reinforcing fibers and a thermoplastic resin using molds containing an upper mold and a lower mold. In the method, the respective parameters for: heating temperature; charge time; air-cooling rate; pressurization time; flow-stopping temperature; and a moldable time satisfies specified numerical ranges simultaneously.

6 Claims, 4 Drawing Sheets

(51) Int. Cl.
*B32B 37/10* (2006.01)
*B29C 43/52* (2006.01)
*B29K 77/00* (2006.01)
*B29K 105/12* (2006.01)
*B29K 67/00* (2006.01)
*B29K 101/12* (2006.01)
*B29K 307/04* (2006.01)

(52) U.S. Cl.
CPC ................. *B29C 2043/5808* (2013.01); *B29C 2043/5816* (2013.01); *B29C 2043/5833* (2013.01); *B29K 2067/006* (2013.01); *B29K 2077/00* (2013.01); *B29K 2101/12* (2013.01); *B29K 2105/12* (2013.01); *B29K 2307/04* (2013.01)

(58) Field of Classification Search
USPC ......................................................... 264/319
See application file for complete search history.

(56) References Cited

FOREIGN PATENT DOCUMENTS

| | | |
|---|---|---|
| JP | 2014-047286 A | 3/2014 |
| WO | 2006-010592 A1 | 2/2006 |

PRESS MOLDING PRODUCTION METHOD

CROSS REFERENCE TO RELATED APPLICATIONS

This is a U.S. National Phase Application under 35 U.S.C. § 371 of International Application No. PCT/JP2017/027285, filed Jul. 27, 2017, which claims priority to Japanese Application No. 2016-148626, filed Jul. 28, 2016, the entire contents of which are incorporated herein by reference.

TECHNICAL FIELD

The present invention relates to a method for manufacturing a cold press molded article which is suitable for thin-wall molding of a resin-based material, the cold press molded article being light in weight, high in strength, and excellent in appearance evaluation.

BACKGROUND ART

In recent years, so-called fiber-reinforced resin materials including matrix resin and reinforcing fibers such as carbon fibers have drawn attention in the mechanical field. These fiber-reinforced resin materials have excellent tensile modulus, tensile strength, and impact resistance because fibers are dispersed in the matrix resin. As a result, the use thereof for structural members of automobiles or the like has been studied. Among them, the fiber-reinforced resin material in which the matrix resin is a thermoplastic resin, that is a fiber-reinforced thermoplastic resin material, has been studied in a number of fields because it is excellent in mass productivity in terms of a short molding cycle or the like as compared with the fiber-reinforced resin material in which the matrix resin is a thermosetting resin.

By molding the fiber-reinforced resin material by various molding methods such as an injection molding method and a compression molding method, various structural members can be produced with high productivity regardless of size. Among the molding methods for molding the fiber-reinforced resin material, the compression molding method is suitable for efficiently producing a fiber-reinforced resin molded article including reinforcing fibers having a long fiber length. In particular, a cold press molding method has a remarkable short molding cycle and is suitable for efficiently producing a molded article which, includes reinforcing fibers and a thermoplastic resin as a matrix, and has a complicated three-dimensional shape with excellent design.

For example, Patent Literature 1 discloses a method for producing a molded article which is thin-walled, light in weight and high in strength, and excellent in design, and has a complicated three-dimensional shape with high productivity by compression molding a fiber-reinforced resin material in which reinforcing fibers are two-dimensionally oriented in an in-plane direction and have isotropy and the reinforcing fibers include reinforcing fiber bundles in a specific range. On the other hand, customers have strong demand for lighter, thinner, shorter, and smaller molded articles obtained from the fiber-reinforced resin material, and the molded article is required to be further thin-walled.

As means for obtaining the molded article having a good appearance in a cold press molding method performed by disposing a fiber-reinforced resin material in a mold cavity, the following proposal is presented. Specifically, Patent Literature 2 proposes a method for manufacturing a press molded article from a prepreg having a thickness of 2.5 mm by using a mold set to be equal to or higher than a glass transition temperature of the thermoplastic resin and decreasing a mold temperature to around the glass transition temperature in a cold press molding process. It can be said that the moldability is improved and the molded article can also be further thin-walled by applying this means and setting the mold temperature to be higher than the mold temperature at which the good appearance is obtained. However, since there is no disclosure of specific molding parameters, the temperature specification of equipment for performing mold cooling and mold heating required for increasing and decreasing the mold temperature in accordance with the molding cycle and the specification of a press molding machine are unclear. Further, since there is no disclosure of specific cooling parameters of the fiber-reinforced resin material in the cold press molding process, the specification of the fiber-reinforced resin material is also unclear. As a result of these matters, in terms of both equipment and material aspects, the specification of the equipment and the specification of the fiber-reinforced resin material had to be issued through trials and errors. Therefore, since the perspective of realizing further wall-thinning is unclear, attention was not drawn from the industrial viewpoint.

CITATION LIST

Patent Literature

[PTL 1] US-A 2013/0344282
[PTL 2] JP-A2013-103481

SUMMARY OF INVENTION

Technical Problem

An object of the present invention is to provide a method for manufacturing a fiber-reinforced resin molded article by cold press molding a fiber-reinforced resin material made of a thermoplastic resin and reinforcing fibers, the method having excellent moldability to obtain a thin-walled molded article, the fiber-reinforced resin molded article having a large numerical value obtained by dividing bending strength by the weight per unit area and being excellent in appearance.

The inventors have carefully investigated the reason why the moldability in the cold press molding method decreases as the fiber-reinforced resin material becomes thinner. As a result, as a condition in which the fiber-reinforced resin material can be molded during the cold press molding method, it has been found that both of a condition that the fiber-reinforced resin material is in moldable temperature and a condition that the fiber-reinforced resin material is in moldable pressing pressure must be compatible. Further, the inventor conceived that the time period when both of the two conditions are compatible with each other is moldable time, and if the moldable time can be calculated, the prospect of realizing further wall-thinning becomes clearer. The inventor intensively conducted the examination to arrive at the present invention.

Solution to Problem

In order to obtain a method for manufacturing a cold press molded article suitable for thin-wall molding corresponding to further wall-thinning of a molded article, the present inventors conceived that cold press molding should be carried out using a fiber-reinforced resin material or equipment in which the moldable time calculated by a molding parameter in cold press molding method and a cooling parameter of the fiber-reinforced resin material is within a certain range. The inventors completed the present invention as a result of intensive studies.

That is, the present invention is summarized as follows.

[1] A method for manufacturing a fiber-reinforced resin molded article by cold press molding a fiber-reinforced resin material including reinforcing fibers and a thermoplastic resin by using molds containing an upper mold and a lower mold. The method satisfies the following a) to f) simultaneously.

a) The internal temperature of the fiber-reinforced resin material immediately after heating before molding (hereafter referred to as T or heating temperature) is in a temperature range higher than the melting point of the crystalline resin by 50 to 100° C. in case where the thermoplastic resin is the crystalline resin, or the heating temperature is in a temperature range higher than a glass transition temperature of an amorphous resin by 125 to 175° C. in case where the thermoplastic resin is the amorphous resin.

b) A time from the end of heating the fiber-reinforced resin material until the heated fiber-reinforced resin material (hereinafter referred to as tc or a charge time) is arranged on the lower mold is 6.0 to 35.0 seconds.

c) A cooling rate (hereafter referred to as C1 or an air-cooling rate) of the fiber-reinforced resin material from the end of heating the fiber-reinforced resin material to the time point when the fiber-reinforced resin material is arranged on the lower mold and is brought into contact with the upper mold is 1.0 to 6.5° C./sec.

d) A time (hereafter referred to as tp or a pressurization time) from when the upper mold is brought into contact with the fiber-reinforced resin material until the pressing pressure reaches a specified pressure is 0.1 to 2.5 sec.

e) A temperature when the fiber-reinforced resin material stops flowing (hereafter, referred to as Tf or a flow stop temperature) is in a temperature range of 25° C. lower than the melting point of the crystalline resin to 30° C. higher than the melting point thereof in case where the thermoplastic resin is the crystalline resin, or the flow stop temperature is in a temperature range higher than the glass transition temperature by 50 to 105° C. in case where the thermoplastic resin is the amorphous resin.

f) A time from the time point when the pressure of the press molding machine reaches half of the specified pressure after the upper mold is brought into contact with the fiber-reinforced resin material to the time point when the temperature of the fiber-reinforced resin material reaches the flow stop temperature (hereafter referred to as tm or a moldable time) is 0.01 to 18 sec, the tm satisfies the following formula (1) using the above a) to e). In the above summary of the invention, satisfying a) to f) simultaneously means that all of a) to f) are satisfied.

$$tm = \frac{T - (C1 \times tc + C2 \times 0.5 \times tp) - Tf}{C2} \quad (1)$$

[In Formula (1), tm represents the moldable time, T represents the heating temperature, tc represents the charge time, C1 represents the air-cooling rate, tp represents the pressurization time, Tf represents the flow stop temperature, and C2 represents a cooling rate of the fiber-reinforced resin material from when the upper mold is brought into contact with the fiber-reinforced resin material to when the fiber-reinforced resin material reaches the flow stop temperature (hereinafter referred to as C2 or a cooling rate during pressing)].

[2] In the method for manufacturing the fiber-reinforced resin molded article according to [1], the thermal decomposition rate of the thermoplastic resin configuring the fiber-reinforced resin material at the time of heating (hereinafter, referred to as a thermal decomposition rate) is preferably 0.03 to 0.2 wt %/sec.

[3] In the method for manufacturing the fiber-reinforced resin molded article according to any one of [1] and [2], C2 is 1.5 to 100° C./sec.

[4] In the method for manufacturing the fiber-reinforced resin molded article according to any one of [1] to [3], the moldable time is 0.2 to 10.0 sec.

[5] In the method for manufacturing the fiber-reinforced resin molded article according to any one of [1] to [4], a specified pressure of the press molding machine (hereinafter, referred to as a specified pressing pressure) is preferably 10 to 50 MPa.

[6] In the method for manufacturing the fiber-reinforced resin molded article according to any one of [1] to [5], the reinforcing fibers are a mixture of single-fiber bundles having different numbers of single fibers.

[7] In the method for manufacturing the fiber-reinforced resin molded article according to any one of [1] to [6], the reinforcing fibers are carbon fibers and a weight average fiber length of the carbon fibers is 1 to 100 mm, and a ratio of reinforcing fiber bundles (A) composed of carbon single fibers of equal to or more than a critical single fiber number defined by the following Formula (2) to a total amount of the reinforcing fibers is 20 to 99 vol %.

$$\text{Critical single fiber number} = 600/D \quad (2)$$

[Here, D is the average single fiber diameter (μm) of the reinforcing fibers.]

Advantageous Effects of Invention

According to the manufacturing method of the present invention, a further thin-walled molded article can be obtained in the method for manufacturing the fiber-reinforced resin molded article by cold press molding a fiber-reinforced resin material made of a thermoplastic resin and reinforcing fibers, and the fiber-reinforced resin molded article having a large numerical value obtained by dividing bending strength by the weight per unit, and being also excellent in appearance can be manufactured.

DESCRIPTION OF EMBODIMENTS

Figure 1:
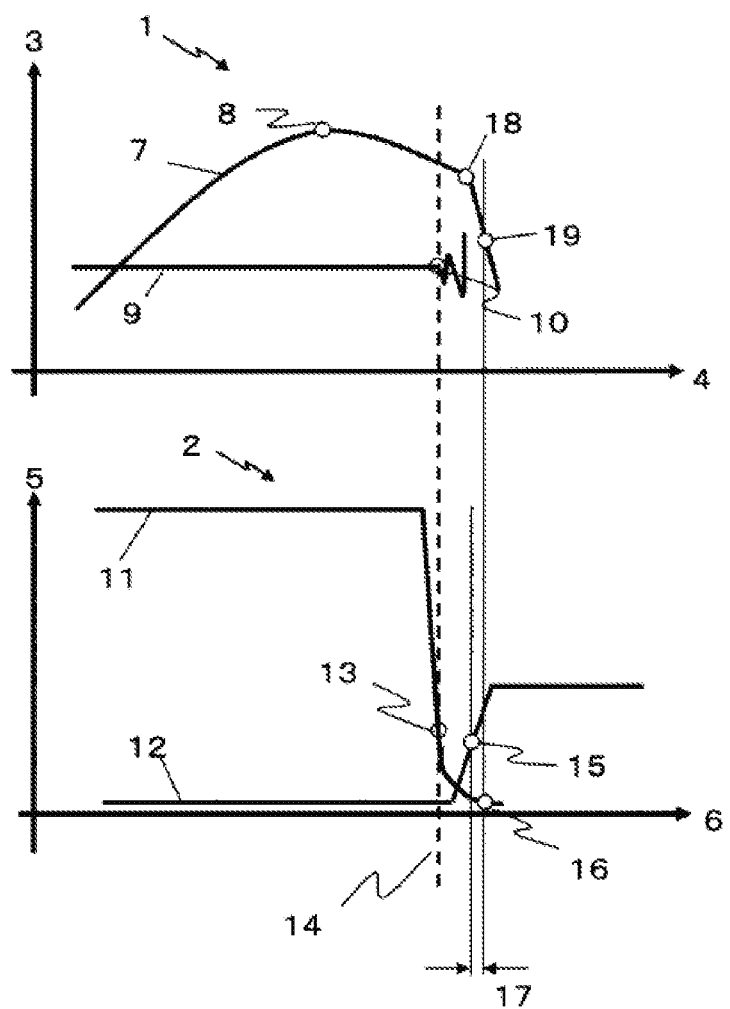
FIG. 1 is a diagram of: a graph showing a change of a temperature in a fiber-reinforced resin material and a change of a temperature at a specific position of a mold with time; and a graph showing a change of a platen position and a change of pressing pressure of a press molding machine with time, in which time axes of both graphs are adjusted.

Hereinafter, an embodiment of the present invention will be sequentially described. In the present invention, for convenience, a "fiber-reinforced resin material" may be referred to as a "resin material", a "fiber-reinforced resin molded article" may be referred to as a "press molded article" or a "molded article", and "cold press molding" may be abbreviated as "press molding". For convenience, mass may be expressed as weight. Numerical values of dimensions of each part in the drawings are numerical values in millimeters (mm) unless otherwise specified.

(Cold Press Molding)

The cold press molding method of the present invention is a preferable method for manufacturing the molded article in that breakage of reinforcing fibers in a resin material is less likely to occur, and productivity and isotropy of the resin material are easily maintained. Specifically, the method includes: heating the resin material before molding using a heater; arranging the heated resin material on a lower mold of molds having an upper mold and the lower mold; applying a pressing pressure to the resin material by lowering the upper mold or raising the lower mold by a press molding machine; and removing the molded product from the lower mold. Hereinafter, the case where the upper mold is lowered and molding is performed by the press molding machine will be mainly described, but this does not indicate that the scope of the present invention is limited in the movement direction of the mold.

(Moldable Time: Part 1)

Moldable time (tm) of the present invention is a time from a time point when the pressure of the press molding machine reaches half of the specified pressure after the resin material arranged on the lower mold is brought into contact with the upper mold to a time point when a temperature of the fiber-reinforced resin material decreases to reach a flow stop temperature, and is calculated according to the following Formula (1) using molding parameters and cooling parameters described later.

$$tm = \frac{T - (C1 \times tc + C2 \times 0.5 \times tp) - Tf}{C2} \quad (1)$$

[In Formula (1), tm represents the moldable time, T represents a heating temperature, tc represents a charge time, C1 represents an air-cooling rate, tp represents a pressurization time, Tf represents the flow stop temperature, and C2 represents a cooling rate of the fiber-reinforced resin material from when the upper mold is brought into contact with the fiber-reinforced resin material to when the fiber-reinforced resin material reaches the flow stop temperature (hereinafter referred to as C2 or a cooling rate during pressing)].

The moldable time of the present invention indicates a time from a flow starting point when a certain shear force or more is applied to the resin material at a temperature equal to or higher than a melting point of a thermoplastic resin configuring the resin material to a flow end point when the temperature of the resin material falls below the flow stop temperature. Generally, the longer the moldable time, the better the moldability, but if the moldable time is too long, the resin material may flow into the gap between the upper mold and the lower mold. As a result, a large burr is generated, which is not preferable. On the contrary, if the moldable time is short, for example, since wrinkles generated on an elevation surface cannot be crushed when a complicated shape having an elevation surface is molded, the resulting molded article does not have a uniform wall-thickness and is inferior in moldability, which is not preferable. That is, the moldable time in the present invention is 0.01 to 18.0 seconds, preferably 0.2 to 10.0 seconds, more preferably 0.3 to 8.0 seconds, and particularly preferably 0.4 to 6.0 seconds. If the moldable time is less than 0.01 second, the moldability is inferior, and if the moldable time exceeds 18.0 seconds, a large burr is likely to be generated in the molded article. The flow of the thermoplastic resin in the present invention is not limited to the in-plane directions of the fiber-reinforced resin material or the fiber-reinforced molded article, that is, the directions perpendicular to a driving direction of the mold at the time of press molding, and includes the thickness direction of the fiber-reinforced resin material and the fiber-reinforced molded article, that is, the driving direction of the mold at the time of press molding.

(Molding Parameters and Cooling Parameters)

The moldable time varies greatly with molding parameters and cooling parameters. The molding parameters in the present invention are the heating temperature (T), the charge time (tc), and the pressurization time (tp), and the cooling parameters are the air-cooling rate (C1), the flow stop temperature (Tf) and the cooling rate during pressing (C2). The molding parameters indicate using methods and specifications of the heater, a resin material conveying device and the press molding machine. The cooling parameters indicate the type, composition and form of the thermoplastic resin, the reinforcing fibers, or the like configuring the resin material, the temperature, the heat capacity, and the weight of the mold. In practice, these parameters are comprehensively derived from the using method and specification of the apparatus and equipment described above, the type, composition and form of the thermoplastic resin and the reinforcing fibers configuring the resin material, the temperature, the heat capacity, and the weight of the molds, and these parameters are values that vary when one or two or more of the above conditions are changed.

(Heating Temperature)

The heating temperature (T) is an internal temperature of the fiber-reinforced resin material immediately after heating before molding, and is a parameter including a using method and specifications of the heater. A hot air heater, an infrared heater, or the like are used as a heater for heating the resin material. The heating temperature is a temperature considering influences of thermal conductivity and thermal emissivity of the resin material in a time integration of an amount of heat given by the heater, and is set so as to obtain an aimed moldability.

When the thermoplastic resin contained in the resin material is a crystalline resin, the heating temperature is in a temperature range higher than the melting point of the crystalline resin by 50 to 100° C. When the heating temperature is not higher than the melting point by 50° C., since the temperature of the resin material at the flow start point decreases, the melt viscosity of the resin material is increased, and the moldability, particularly the thin-walled moldability, may be inferior. If the heating temperature exceeds the melting point of the crystalline resin by 100° C., since the temperature of the resin material at the flow starting point becomes too high, the melt viscosity of the resin material becomes smaller and a large burr is generated, which is not preferable. When the thermoplastic resin contained in the resin material is an amorphous resin, the heating temperature is in a temperature range higher than a glass transition temperature of an amorphous resin by 125 to 175° C. If the heating temperature is not higher than the melting point by 125° C., since the temperature of the resin material at the flow start point decreases, the melt viscosity of the resin material increases, and the moldability, particularly the thin-walled moldability, may be inferior. If the heating temperature exceeds the glass transition temperature of the amorphous resin by 175° C., since the temperature of the resin material at the flow starting point becomes too high, the melt viscosity of the resin material becomes smaller and a large burr is generated, which is not preferable. The heating temperature is preferably higher than the melting point of the crystalline resin by 60 to 90° C. or higher than the glass transition temperature of the amorphous resin by 130 to 170° C., and is more preferably higher than the melting point of the crystalline resin by 65 to 85° C. or higher than the glass transition temperature of the amorphous resin by 140 to 160° C.

(Charge Time)

The charge time (tc) is a time from the end of heating the fiber-reinforced resin material until the heated fiber-reinforced resin material is arranged on the lower mold. In other words, the charge time is a time from a time point when heating the resin material to the heating temperature is finished to a time point when the upper mold is brought into contact with the fiber-reinforced resin material. The charge time is a parameter including a using method and specifications of the resin material conveying device. The conveying device for conveying the resin material is not particularly limited, and for example, a robot, a belt conveyer, or the like may be used, and the resin material may be taken out from the heating machine and arranged on the lower mold by human power, or shaping may be performed to adjust the shape of the resin material after the resin material is installed on the lower mold, and these shapes are set so as to obtain the aimed moldability.

The charge time ranges from 6.0 to 35.0 seconds. If the charge time is less than 6.0 seconds, in a case of conveying the resin material using the equipment, the specification of the resin material conveying device becomes ultrahigh speed operation and the equipment becomes expensive, which is not preferable. Further, a large acceleration is applied to the fiber-reinforced resin material accompanying the high-speed operation, and the fiber-reinforced resin material heated to the heating temperature may be deformed, which is not preferable. On the other hand, if the charge time is less than 6.0 seconds in the case of manually conveying, the time is too short and implementation is difficult. When the charge time exceeds 35 seconds, since the temperature of the resin material at the flow start point decreases, the melt viscosity of the resin material is increased, and the moldability, particularly the thin-walled moldability, is inferior. The charge time is preferably 8.0 to 34.0 seconds, more preferably 10.0 to 30.0 seconds, and particularly preferably 11.0 to 26.0 seconds.

(Pressurization Time)

Pressurization time (tp) is a time from when the upper mold is brought into contact with the fiber-reinforced resin material until the pressing pressure indicated by a pressure gauge arranged in the press molding machine reaches a specified pressing pressure value.

As the press molding machine, it is preferable to use an electric press molding machine using a high-speed servo motor, a hydraulic pump having a large discharge amount in a hydraulic circuit, or a hydraulic press molding machine arranged with a speed increasing device. In particular, it is preferable to use a hydraulic linear press molding machine arranged with an accumulator tank as the speed increasing device. More specifically, the accumulator tank can temporarily increase the pressurization rate in the mold by releasing a hydraulic pressure in the accumulator tank when the hydraulic pressure in the accumulator tank is accumulated and the mold is mold clamped. As a result, the pressurization time can be shortened. Further, the hydraulic pressure hydraulic press molding machine can be preferably used from the viewpoint of maintaining high pressure for a long time.

When the accumulator tank is used as the speed increasing device, the timing of opening the accumulator tank and the capacity of the accumulator tank are important. In the case of obtaining a planar molded article, it is preferable that a speed increasing effect is developed at a timing when the upper mold is brought into contact with the fiber-reinforced resin material. In consideration of the delay of the pressure transmission time of the hydraulic pressure or the like, if the accumulator tank is opened at a time point when the upper mold reaches an upper position which is 0 to 5 mm higher than the thickness of the resin material, a sufficient acceleration effect can be obtained even if the capacity of the accumulator tank is small, which is preferable. On the other hand, when a molded article having a three-dimensional shape including convex-concave is obtained, wrinkles caused by drawing the resin material and folding the resin material along the shape of the molded article when the mold is clamped are likely to occur. In particular, when a molded article having an elevation surface of the convex-concave is obtained, wrinkles are likely to occur. In order to obtain a molded article having less wrinkles and a uniform surface, it is preferable to open the accumulator tank at a time point when the resin material is drawn or when the bending starts so as to accelerate the upper mold and shorten the pressurization time. In order to eliminate the wrinkles caused by the drawings of the resin material and folding, for example, the following method of mold clamping can be cited. That is, it is a method of clamping the mold at high speed using a small diameter hydraulic cylinder capable of operating at high speed and under low pressure and opening the accumulator tank while the generated wrinkle is crushed. Using this method does not require excessive pressure to be applied to the resin material, which is also preferable for the equipment.

As a method of controlling the accumulator tank, for example, a position control method based on a slide position of the upper mold is preferable. As a simpler method, the accumulator tank can also be controlled by controlling the hydraulic pressure. Specifically, in this method, in order to crush the wrinkles caused by drawing the resin material and folding the resin material along the shape of the molded article when the mold is clamped, the accumulator tank is opened at a timing when the hydraulic pressure of the small diameter hydraulic cylinder capable of operating at high speed and under the low pressure reaches a predetermined pressure. If this method is used, it is not necessary to use a device with a large cylinder diameter in the manufacturing equipment or to operate a large pressure, and the pressurization time is shortened. In this case, it is possible to suitably use a small molding machine having a short hydraulic transmission time so as not to generate a hydraulic transmission time delay.

The pressurization time (tp) is a time from the time point when the upper mold is brought into contact with the fiber-reinforced resin material until the time point when the pressure gauge in the press molding machine reaches the specified pressing pressure value. The physical property is low since the flow of the resin material in the first half of the pressurization time is insufficient, and a large number of voids remain inside the molded article, which is not preferable since the physical property is low. Therefore, in the present invention, the time after a time point when half value of the specified pressing pressure is exceeded as described above is set as the moldable time described later.

The pressurization time ranges from 0.1 to 2.5 seconds. If the pressurization time is less than 0.1 second, an electric press molding machine equipped with a servo motor with fast pressure response has to be used. Since the molding machine driven by the servo motor cannot handle a mold larger than the molding machine driven by the hydraulic pressure, the size of the press moldable molded article is reduced. When a structural member such as an automobile is manufactured by combining molded articles of a small size, the number of joining portions between the molded articles increases, and an effect of weight reduction compared with a case where a structural member is made of metal is reduced, which is not preferable in the industry. If the pressurization time exceeds 2.5 seconds, the contact time between the resin material and the upper mold is increased, and the temperature of the resin material at the flow start point decreases and the moldability is inferior. The pressurization time is preferably 0.2 to 2.0 seconds, and more preferably 0.3 to 1.0 second.

(Air-Cooling Rate)

The air-cooling rate (C1) is a cooling rate of the fiber-reinforced resin material from the end of heating the fiber-reinforced resin material to the time point when the fiber-reinforced resin material is brought into contact with the upper mold after the fiber-reinforced resin material is arranged on the lower mold. The air-cooling rate is affected by: the thickness of the resin material; the type, the content and the dispersion state of the reinforcing fibers contained in the resin material; the atmosphere temperature; and the air flow. Particularly the influence of the thickness of the resin material is large. The air-cooling rate tends to increase as the thickness of the resin material decreases, and the air-cooling rate tends to decrease as the thickness increases.

The air-cooling rate ranges from 1.0 to 6.5° C./sec. If the air-cooling rate is less than 1.0° C./sec, it means that the thickness of the resin material is substantially large, and thus the customer's requirement for the thin-walled moldability may not be met. Further, assuming that the thickness of the resin material meets the requirement for the thin-walled moldability, the productivity of the molded article may be inferior, which is not preferable. On the other hand, if the air-cooling rate exceeds 6.5° C./sec, since the temperature drop of the resin material until charging is large, the temperature of the resin material at the flow start time decreases and the moldability is inferior. The air-cooling rate is preferably 1.2 to 6.0° C./sec, more preferably 1.3 to 5.0° C./sec, even more preferably 1.5 to 4.0° C./sec, and particularly preferably 1.6 to 3.0° C./sec.

(Flow Stopping Temperature)

The flow stop temperature (Tf) is a temperature when the flow of the fiber-reinforced resin material is stopped. The flow stop temperature is a parameter affected by: the melt viscosity of the thermoplastic resin contained in the fiber-reinforced resin material; and the content, type and form of the reinforcing fibers. When the thermoplastic resin contained in the resin material is a crystalline resin, since the crystalline resin causes a significant increase in the melt viscosity due to crystallization in the vicinity of a temperature-decreasing crystallization temperature, a lower limit of the flow stop temperature of the resin material is close to the temperature-decreasing crystallization temperature of the crystalline resin. Depending on the content, type, and form of the reinforcing fibers, the flow may be stopped at a temperature higher than the temperature-decreasing crystallization temperature due to the flow resistance of the reinforcing fibers. When the thermoplastic resin contained in the resin material is an amorphous resin, although the amorphous resin causes an increase in the melt viscosity as the temperature decreases, since the mobility of a polymer chain of the amorphous resin is inhibited compared with the crystalline resin, the flow stops at a temperature higher than the glass transition temperature at which the mobility of the polymer chain is lost by several tens of ° C. Depending on the content, type, and form of the reinforcing fibers, the flow may be stopped at a higher temperature due to the flow resistance of the reinforcing fibers.

When the thermoplastic resin is a crystalline resin, the flow stop temperature in the present invention is in a temperature range of 25° C. lower than the melting point of the crystalline resin to 30° C. higher than the melting point thereof, and when the thermoplastic resin is an amorphous resin, the flow stop temperature is in a temperature range higher than the glass transition temperature by 50 to 105° C. When the temperature is within this temperature range, it is possible to ensure moldability capable of molding a thin wall. It is not preferable that when the flow stop temperature is lower than the temperature range, the moldability is interior, and when the flow stop temperature is higher than the temperature range, a large burr may be generated undesirably in the molded article. When the thermoplastic resin is a crystalline resin, the flow stop temperature is preferably in a temperature range of 15° C. lower than the melting point of the crystalline resin to 20° C. higher than the melting point thereof, and when the thermoplastic resin is an amorphous resin, the flow stop temperature is preferably in a temperature range higher than the glass transition temperature by 60 to 100° C. When the thermoplastic resin is a crystalline resin, the flow stop temperature is even more preferably in a temperature range of 10° C. lower than the melting point of the crystalline resin to 10° C. higher than the melting point thereof, and when the thermoplastic resin is an amorphous resin, the flow stop temperature is more preferably in a temperature range higher than the glass transition temperature by 70 to 90° C.

(Cooling Rate during Pressing)

The cooling rate during pressing (C2) of the present invention is a cooling rate of the fiber-reinforced resin material from the time point when the upper mold is brought in contact with the fiber-reinforced resin material to a time point when the flow stop temperature is reached. During pressing, heat conduction from the resin material to the mold occurs while the resin material and the mold are in contact with each other, and the cooling rate is higher than the above described air-cooling rate. That is, the cooling rate during pressing (C2) may be greater than the air-cooling rate (C1). Therefore, the cooling rate during pressing is affected by: the thickness of the resin material; the type, the content and dispersion state of the reinforcing fibers contained in the resin material; and the mold temperature. The influence of the mold temperature is particularly strong. When the mold temperature decreases, since the heat conduction from the resin material to the mold increases, the cooling rate during pressing increases; when the mold temperature increases, since the heat conduction from the resin material to the mold decreases, the cooling rate during pressing decreases. When the cooling rate during pressing decreases, the temperature of the resin material at the flow start point increases, and the moldability is improved, and thus it is important to increase the mold temperature to cope with further wall-thinning.

The cooling rate during pressing is preferably 1.5 to 100° C./sec. If the cooling rate during pressing is less than 1.5° C./sec, the thickness of the resin material increases, and thus the customer's requirement for the thin-walled moldability may not be met. Further, it is not preferable that when the thickness of the resin material meets the requirement for the thin-walled moldability, the productivity of the molded article may be inferior. On the other hand, when the press cooling rate exceeds 100° C./sec, the temperature of the resin material at the flow start point decreases, and the moldability, in particular, the thin-walled moldability may be inferior. The cooling rate during pressing is more preferably 3.0 to 70.0° C./sec, even more preferably 3.5 to 60.0° C./sec, and particularly preferably 5.0 to 55.0° C./sec.

(Moldable Time: Part 2)

The moldable time (tm) is the time from the time point when the pressure of the press molding machine reaches half of the specified pressure after the resin material arranged on the lower mold is brought into contact with the upper mold to the time point when the temperature of the fiber-reinforced resin material decreases to reach the flow stop temperature. An image of the moldable time is shown in FIG. 1. It is difficult to estimate at which time point the flow of the resin material starts in the pressurization process of the press molding machine because the flow is influenced not only by the time point of starting pressurization on a molding machine side and the pressurizing speed but also by the shape of the mold. The inventors of the present invention confirmed experimentally that when the pressurization time is short as in the present invention, it can be regarded that the flow of the resin material started when the pressure of the press molding machine reaches half of the specified pressure.

The moldable time can be calculated by the following formula (1) using the parameters described above.

[Equation 3]

$$tm = \frac{T - (C1 \times tc + C2 \times 0.5 \times tp) - Tf}{C2} \quad (1)$$

The moldable time is preferably 0.01 to 18.0 seconds, and more preferably 0.2 to 10.0 seconds. The moldable time is even more preferably 0.3 to 8.0 seconds, particularly preferably 0.4 to 6.0 seconds. It is not preferable that if the moldable time is less than 0.01 seconds, the time required for the resin material to flow may be shorter, the moldability may be inferior, and if the moldable time exceeds 18.0 seconds, a large burr may be generated.

(Thermal Decomposition Rate)

In the present invention, the thermal decomposition rate of the thermoplastic resin configuring the fiber-reinforced resin material at the time of heating (hereinafter, referred to as a thermal decomposition rate) is preferably 0.03 to 0.2 wt %/sec.

If the thermal decomposition rate is less than 0.03 wt %/sec, a sufficient heating rate is not given, and a heating temperature indicating sufficient moldability is not reached, which is not preferable. On the other hand, when the thermal decomposition rate exceeds 0.2 wt %/sec, thermal decomposition of the thermoplastic resin configuring the resin material proceeds extremely from when the resin material is heated to a predetermined heating temperature to when the cold press molding step is completed, and it may be difficult to manufacture a molded article having sufficient strength (for example, bending strength, tensile strength, etc). The thermal decomposition rate is more preferably 0.04 to 0.18 wt %/sec, and even more preferably 0.05 to 0.15 wt %/sec.

(Press Molding Machine)

As described above, the press molding machine is preferably an electric press molding machine using a high-speed servo motor, or a hydraulic press molding machine where a hydraulic pump or a speed increasing device with a large discharge amount is arranged in a hydraulic circuit. In particular, it is preferable to use a hydraulic linear press molding machine arranged with an accumulator tank as the speed increasing device. However, the present invention is not limited thereto as long as the effects of the present invention are not impaired.

(Specified Pressing Pressure)

In the present invention, a specified pressure of the press molding machine used in the cold press molding method (hereinafter, referred to as a specified pressing pressure) is preferably 10 to 50 MPa.

When the specified pressing pressure is less than 10 MPa, since the moldability is insufficient, voids are generated inside the molded article, and the physical properties of the molded article deteriorate, resulting in unpreferable conditions. On the other hand, when the specified pressing pressure exceeds 50 MPa, since galling of the mold occurs when the upper mold and the lower mold meet, there is a need for a large press molding machine that shortens the life of the mold and generates a large pressing pressure, which may be undesirable in the industry. The prescribed pressing pressure is more preferably 13 to 30 MPa, and even more preferably 15 to 25 MPa. Hereinafter, the upper mold is referred to as a mold upper mold and the lower mold is referred to as a lower mold.

(Molds)

Figure 4:
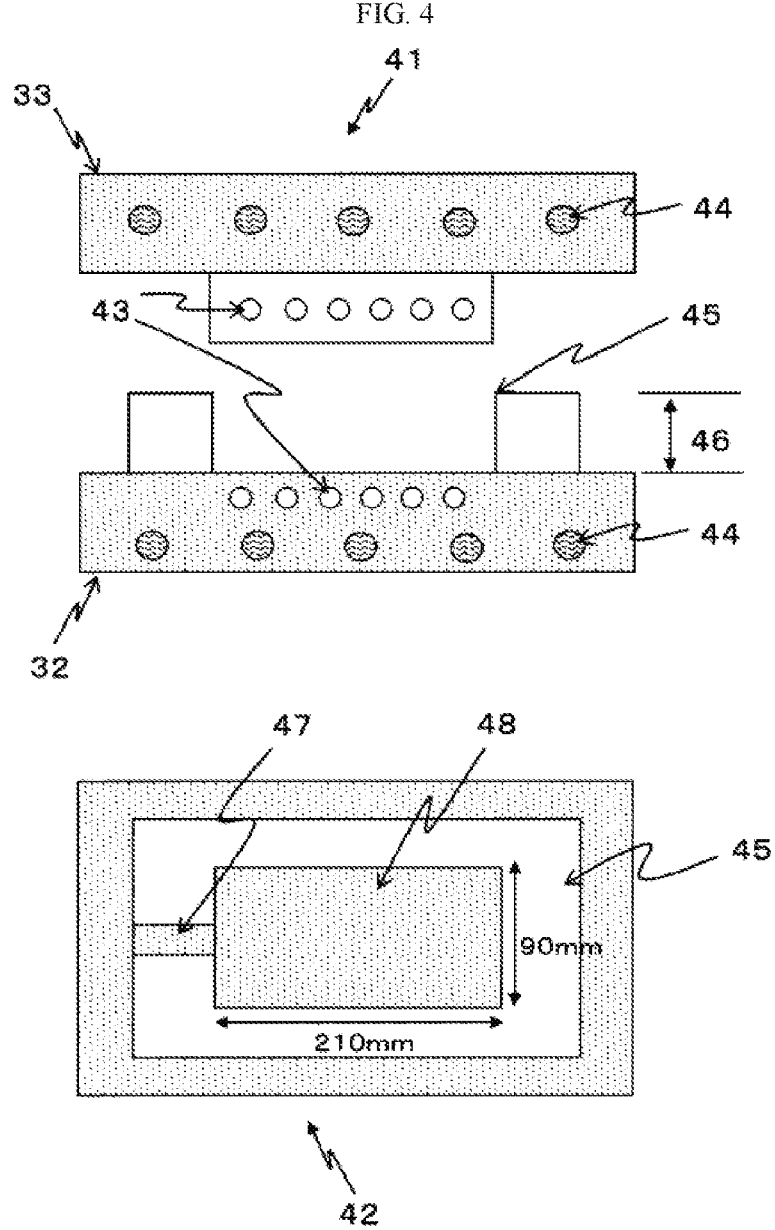
FIG. 4 is an example of a set view of molds used in examples and comparative Examples, and a top view of the lower mold.

In the present invention, the shape of the molded article is not particularly limited, and the shapes of the molds do not require any particular limitation, but a configuration including the upper mold and the lower mold is necessary. An example 41 of a set of an upper mold 33 and a lower mold 32 suitable for performing the manufacturing method of the present invention, and an example 42 of a top view of the lower mold is shown in FIG. 4. Specifically, it is preferable to have a structure having a shear edge structure (45 and 46 in FIG. 4) and to have a structure in which a cavity (48 in FIG. 4) inside the mold becomes a sealed space when the mold is completely closed. The cavity inside the mold forms a sealed space, and thus it is possible to easily obtain a molded article having a uniform appearance to an end portion of the press molded article. However, by using the manufacturing method of the present invention, a molded article having a relatively good appearance can be manufactured even in a so-called open cavity. When the so-called open cavity that does not become a sealed space is used, since the tip of the resin material flows without contacting the mold, it is difficult to have the same appearance in a flow surface and a non-flow surface. However, by using the manufacturing method of the present invention, since the flow surface and the non-flow surface are pressurized substantially simultaneously when the open cavity is used, the molded article having relatively no difference in appearance between the flow surface and the non-flow surface can be manufactured. In the example 42 of the top view of the lower mold in FIG. 4, a path 47 of a thermocouple for temperature measurement in the fiber-reinforced material is shown. As will be described later, it is arranged to adjust a graph of a temperature change with time to a graph of a platen position change with time, and is not necessary to be arranged in an industrial continuous production process. Further, in FIG. 4, the size of the cavity surface 48 is shown, but this merely shows the size of the cavity used to manufacture the molded article shown in the examples and comparative examples, and this size is not intended to limit the present invention.

(Temperature Control Method for Mold)

A temperature control method for the mold is not particularly limited, but a method using a so-called heat and cool molding technique in an injection molding technique is preferable because of excellent moldability. The method using the heat and cool molding technique is known and is a method as described below. In the injection molding, the mold temperature further increases from a mold temperature set before molding by a heating medium circulating in the mold, and injection molding is performed in a state where the mold temperature at the time when the resin material flows is high enough to be advantageous to moldability. Next, after the resin material is injected into the mold and molded, the mold is cooled by the cooling medium before the resin material is released from the mold, and the mold temperature decreases such that the resin material is easily released. The method using the heat and cool molding technique represents the temperature control method for the mold as described above.

Specifically, as shown in FIG. 4, molds (41, 42) in which cooling medium paths 44 and heating medium paths 43 are arranged in the upper mold 33 and the lower mold 32 are included. A known liquid or gas medium such as water, oil, ethylene glycol, or air is used as the cooling medium, and water and air are preferably used in combination from the viewpoint of easy handling. As the heating medium, a known heat medium such as water, oil, steam, ethylene glycol, a cartridge heater, a sheathed heater, an induction coil, and a conductive metal band is used. When the temperature difference before and after the temperature increase of the mold, that is, the temperature increase range is less than 30° C., it is preferable to use the heating medium that is easy to handle such as water, oil, steam, and ethylene glycol. When the temperature increase range of the mold is 30 to 60° C., it is preferable to use a cartridge heater or a sheathed heater because of the high temperature increase rate. When the temperature increase range of the mold exceeds 60° C., it is preferable to use an induction coil or a conductive metal band having an extremely high temperature increase rate. The heating medium is appropriately selected depending on the temperature increase range, the shape of the mold, and the level of the temperature increase rate. When a medium that can be used both in the cooling medium and the heating medium such as steam water or oil is used, the cooling medium path and the heating medium path may be integrated into one, and for example, the temperature can be increased by making steam flow through one path, after cooling by making water flow through the one path.

The heating medium path is preferably arranged near the mold surface in view of temperature increase efficiency, and specifically, a distance between the mold surface and the heating medium path is more preferably 2 to 50 mm. When the distance between the die surface and the heat medium path is less than 2 mm, strength of the mold is insufficient, and the mold may be cracked or depressed during the press molding method. If the distance between the mold surface and the heating medium path exceeds 50 mm, the temperature increase efficiency may decrease. It is preferable that the cooling medium path is arranged below the heating medium path as seen from the mold surface in that the heating medium path can be easily created. The design of the heating medium path and the cooling medium path is more preferably designed by thermal analysis by a computer in order to achieve a target temperature increase rate and a target cooling rate, and a pitch between paths and a path arrangement are also appropriately designed.

(Heater)

The heater is not particularly limited, and any method can be used. Specifically, examples of the method include: a heating method using a hot air drier; a heating method using an electric heating drier; a heating method using saturated steam or superheated steam; a heating method of sandwiching between heating plates in a mold, a belt conveyer, a heat roller, or the like; a heating method using dielectric heating by infrared rays, far infrared rays, microwaves, high frequency, or the like; and induction heating (IH). Among them, the dielectric heating by infrared rays is more preferable because the thermal efficiency is high and the thermal decomposition rate is low. The upper mold and the lower mold are preferably heated so as to be kept at a set predetermined temperature until the press molding process starts and the platen position of the press molding machine starts to move. This temperature is normally referred to as a mold temperature. The mold temperature in the present invention is preferably set to a temperature lower than the temperature-decreasing crystallization temperature of the thermoplastic resin to be used. More preferably, the mold temperature is in a range lower than the temperature-decreasing crystallization temperature by 50 to 1° C., and even more preferably the mold temperature is in a range lower than the temperature-decreasing crystallization temperature by 30 to 3° C. The temperature-decreasing crystallization temperature is represented by a temperature at which the thermoplastic resin causes an exothermic phenomenon as the crystal solidifies when the thermoplastic resin is placed at a temperature higher than the melting point and temperature decreases at a constant speed after the thermoplastic resin is melted. Normally, a temperature of a peak top appeared when the temperature decreases by using a differential scanning calorimetry (DSC) is represented as the temperature-decreasing crystallization temperature.

(Resin Material Conveying Device)

Examples of the resin material conveying device include a belt conveyor, a vibration conveying device, a pressure-feed device using compressed air, gas, steam, or the like, and a robot having an arm for grasping the resin material or a part like a spatula for scooping up the resin material. Among them, the belt conveyor is suitable as a continuous production equipment, and is preferably arranged with a heating device, a heat retaining device, or the like. Further, the pressure-feed device can convey the resin material to a target place in a short time, and such a conveying device is also preferable. In addition, the robot having an arm, a spatula, or the like can be conveyed in a short time, and this type of conveying device is also preferable since it is made easy to be more compact, various models are used in an automotive field, an industrial machinery field, or the like, and it is made easy to be designed and applied. The equipment and devices exemplified above may be used in combination, and all of them may be used manually.

(Method for Manufacturing Press Molded Article)

A method for manufacturing the press molded article of the present invention is a manufacturing method of cold press molding a fiber-reinforced resin material as shown later. Specifically, the following operation method is performed. First, the resin material is heated to the heating temperature by the heater, and the heated resin material is arranged on the lower mold using the conveying device. Next, after the press molding machine is operated to bring the upper mold into contact with the surface of the resin material, the pressure applied to the press molding machine is increased up to the specified pressing pressure. Finally, after the upper mold and the lower mold are opened, the molded article is taken out to obtain the press molded article. These equipment specifications and conditions are as described above. During the press molding process, the applicant thinks that the thermoplastic resin configuring the fiber-reinforced resin material flows in a time period from when the resin material arranged on the lower mold is brought into contact with the upper mold and the pressure of the press molding machine reaches half of the specified pressure to when the pressure of the press molding machine reaches half of the specified pressure.

(Fiber-Reinforced Resin Material)

The fiber-reinforced resin material used in the present invention includes the reinforcing fibers and the thermoplastic resin which is the matrix resin.

The content of the thermoplastic resin which is the matrix resin in the fiber-reinforced resin material can be appropriately determined according to the type of the thermoplastic resin and the type of the reinforcing fibers. Normally, the thermoplastic resin is preferably in a numerical range of 3 to 1000 parts by weight based on 100 parts by weight of the reinforcing fiber. The content of the thermoplastic resin per 100 parts by weight of the reinforcing fibers in the fiber-reinforced resin material is more preferably 30 to 200 parts by weight, even more preferably 50 to 150 parts by weight, and particularly preferably 80 to 145 parts by weight. If the matrix resin is 3 parts by weight or more based on 100 parts by weight of the reinforcing fiber, impregnation with the thermoplastic resin proceeds sufficiently, and the reinforcing fiber not impregnated with the thermoplastic resin tends to be reduced. When the matrix resin is 1000 parts by weight or less based on 100 parts by weight of the reinforcing fiber, the content of the reinforcing fiber is sufficient and is often appropriate as a structural material. At the same time, when the content of the thermoplastic resin per 100 parts by weight of the reinforcing fiber in the fiber-reinforced resin material is in the above numerical range, it is possible to have a sufficient mechanical strength, such as a high bending strength per weight per unit area even if the molded article is excellent in thin-walled moldability and is thin-walled. As a result, the obtained fiber-reinforced resin molded article can sufficiently exhibit the effects of the present invention, and is a preferable aspect. In the fiber-reinforced resin material of the present invention, even in a case where there is a part where the content of the thermoplastic resin per 100 parts by weight of the reinforcing fiber is different when observed microscopically, it is preferable that the content of the thermoplastic resin per 100 parts by weight of the reinforcing fiber in the whole resin material or the whole molded article is within the above-described part by weight range. In addition, the term "weight" is used for convenience in the present invention, but "mass" should be used for precision. The weight (mass) of the thermoplastic resin based on the weight (mass) of the reinforcing fiber in these fiber-reinforced resin materials represents the weight (mass) ratio of the thermoplastic resin in the fiber-reinforced resin molded article as it is. Further, from the weight (mass) ratios of the reinforcing fiber and the thermoplastic resin in these fiber-reinforced resin materials, the volume ratio can be calculated by dividing the respective weights by the specific gravity (density) of the reinforcing fiber and the thermoplastic resin.

Normally, the weight per unit area of the thermoplastic resin in the fiber-reinforced resin material is preferably in a numerical range of 200 to 5000 g/m$^2$. It is more preferably in a numerical range of 300 to 2500 g/m$^2$, and even more preferably 500 to 1800 g/m$^2$. When the thermoplastic resin is present within the numerical range of the weight per unit area, the reinforcing fiber can be sufficiently impregnated with the thermoplastic resin, the obtained fiber-reinforced resin molded article is excellent in thin-walled moldability and can have a light weight and sufficient strength, and can be suitably used as a structural material. The parts by weight of the thermoplastic resin per 100 parts by weight of the reinforcing fiber can correspond to the ratio of the weight per unit area of the reinforcing fibers and the weight per unit area of the thermoplastic resin.

Examples of an orientation state of the reinforcing fibers in the fiber-reinforced resin material can include a unidirectional orientation state in which long axis directions of the reinforcing fibers are oriented in one direction and a two-dimensional random orientation state in which the long axis directions are randomly oriented in an in-plane direction of the fiber-reinforced resin material.

The reinforcing fibers in the present invention may be either in the unidirectional orientation state or in the two-dimensional random orientation state. The reinforcing fibers in the present invention may be in a non-ordered orientation between the unidirectional orientation state and the two-dimensional random orientation state (a state in which the long axis direction of the reinforcing fibers is not completely oriented in one direction and is not completely random). Depending on the fiber length of the reinforcing fiber, the long axis direction of the reinforcing fiber may be oriented so as to have a certain angle with respect to the in-plane direction of the fiber-reinforced resin material, the fibers may be oriented so as to be entangled in a cotton shape, and the fibers may be oriented like bidirectional woven fabrics such as plain weave and twill weave, multi-axis woven fabrics, nonwoven fabrics, mats, knits, braided cords, papers made of reinforced fibers, or the like.

A fiber-reinforced mat in the present invention refers to a mat formed by depositing or entangling reinforcing fibers. Examples of the fiber-reinforced mat include a two-dimensional random fiber-reinforced mat in which the long axis directions of the reinforcing fibers are randomly oriented in the in-plane direction of the fiber-reinforced resin molded article, and a three-dimensional random fiber-reinforced mat in which the long axis directions of the reinforcing fibers are randomly oriented in each axis direction of X, Y and Z, such as the reinforcing fibers entangled in a cotton shape.

The isotropic base material in the present invention is one mode of the fiber-reinforced resin material, which is the fiber-reinforced mat including a thermoplastic resin. In the isotropic base material of the present invention, examples of an mode in which the thermoplastic resin is contained in the fiber-reinforced mat can include a mode in which a powdery, fibrous or bulky thermoplastic resin is contained in the fiber-reinforced mat or a mode in which a thermoplastic resin layer containing the thermoplastic resin is mounted or laminated on the fiber-reinforced mat.

Reinforcing fibers having different orientation states may be contained in one fiber-reinforced resin material used in the present invention.

Examples of a mode in which reinforcing fibers having different orientation states are contained in the fiber-reinforced resin material can include, for example, (i) a mode in which the reinforcing fibers having different orientation states are arranged in the in-plane direction of the fiber-reinforced resin material, and (ii) a mode in which the reinforcing fibers having different orientation states are arranged in the thickness direction of the fiber-reinforced resin material. In addition, when the fiber-reinforced resin material has a laminated structure composed of a plurality of layers, (iii) a mode in which orientation states of reinforcing fibers contained in each layer are different can be included. In addition, a mode combining the modes (i) to (iii) described above can be included.

The orientation mode of the reinforcing fibers in the fiber-reinforced resin material can be confirmed by the following method. For example, a tensile test based on an arbitrary direction of the fiber-reinforced resin material and a direction perpendicular thereto is performed to measure tensile modulus, and then a ratio (Eδ) obtained by dividing a large value by a small value among the measured tensile modulus values is measured. The orientation mode can be confirmed by a size of the numeric value of the ratio of the elastic modulus. As the ratio of the elastic modulus is closer to 1, it can be evaluated that the reinforcing fibers are isotropically oriented. When the ratio of the elastic moduli obtained by dividing the large value by the small value among the elastic modulus values in two orthogonal directions does not exceed 2, the reinforcing fibers are evaluated as having isotropy, when the ratio is less than 1.5, the isotropy is evaluated as being excellent, and when this ratio does not exceed 1.3, the isotropy is evaluated as being particularly excellent.

Normally, the weight per unit area of the reinforcing fibers in the fiber-reinforced resin material is preferably in a numerical range of 25 to 10000 g/m$^2$. It is more preferably in a numerical range of 200 to 2000 g/m$^2$, and even more preferably in a numerical range of 400 to 1500 g/m$^2$. When the weight per unit area of the reinforcing fibers in the fiber-reinforced resin material is in the above numerical range, it is possible to have a sufficient mechanical strength, such as a high bending strength per weight per unit area even if the molded article is excellent in thin-walled moldability and is thin-walled. As a result, the obtained fiber-reinforced resin molded article can sufficiently exhibit the effects of the present invention, and is a preferable aspect. When the fiber-reinforced resin molded article is manufactured by press molding the fiber-reinforced resin material, unless additional reinforcing fiber or additional molding material is added in particular, the weight per unit area of the reinforcing fibers in the fiber-reinforced resin material can be regarded as the weight per unit area of the reinforcing fibers in the obtained fiber-reinforced resin molded article.

The volume fraction of reinforcing fibers (Vf) in the fiber-reinforced resin material in the present invention is preferably 10 to 80%. The volume ratio is more preferably 20 to 65%, and even more preferably 25 to 55%. When the volume fraction of reinforcing fibers in the fiber-reinforced resin material is in the above numerical range, it is possible to have a sufficient mechanical strength, such as a high bending strength per weight per unit area even if the molded article is excellent in thin-walled moldability and is thin-walled, and the effect of the present invention can be sufficiently exhibited, which is a preferable aspect. Unless additional reinforcing fiber or additional molding material is added to the fiber-reinforced resin material in particular, the value of the volume fraction of reinforcing fibers (Vf) in the fiber-reinforced resin material can be regarded as the value of the volume fraction of reinforcing fibers (Vf) in the obtained fiber-reinforced resin molded article.

The thickness of the fiber-reinforced resin material used in the present invention is not particularly limited, but is preferably in a numerical range of 0.01 mm to 100 mm, more preferably in a numerical range of 0.05 mm to 5.0 mm, even more preferably in a numerical range of 0.1 mm to 3.0 mm, and particularly preferably in a numerical range of 0.6 mm to 2.3 mm. When the thickness of the fiber-reinforced resin material is within the above numerical range, it is possible to obtain a fiber-reinforced resin molded article excellent in moldability, light weight and appearance, and can be suitably used in fields such as automobiles, aircraft, and pressure vessels. When the fiber-reinforced resin material used in the present invention has a configuration in which the plurality of layers are laminated, the thickness refers not to the thickness of each layer, but refers to the total thickness of the whole fiber-reinforced resin materials in which the thicknesses of the plurality of layers are summed.

The fiber-reinforced resin material used in the present invention may have a single-layer structure composed of a single layer, or may have the laminated structure in which the plurality of layers are laminated. As a mode in which the fiber-reinforced resin material has the laminated structure, a plurality of layers having the same composition may be laminated, or a plurality of layers having different compositions may be laminated.

Further, as a mode in which the fiber-reinforced resin material has the laminated structure, layers having different orientation states of reinforcing fibers may be laminated. Examples of such a mode can include a mode in which the layer in which reinforcing fibers are oriented in one direction and the layer in which reinforcing fibers are oriented randomly in two-dimension are laminated. When three or more layers are laminated, a sandwich structure including an arbitrary core layer and a skin layer laminated on front and back surfaces of the core layer may be used.

(Reinforcing Fiber)

The reinforcing fibers contained in the fiber-reinforced resin material of the present invention are preferably carbon fibers, but inorganic fibers other than carbon fibers or organic fibers can also be used depending on the type of the matrix resin and the application of the fiber-reinforced resin material. Examples of the inorganic fibers other than the carbon fiber can include one or more types of inorganic fibers selected from a group including activated carbon fibers, graphite fibers, glass fibers, tungsten carbide fibers, silicon carbide fibers, ceramic fibers, alumina fibers, natural fibers, mineral fibers such as basalt, boron fibers, boron nitride fibers, boron carbide fibers, metal fibers, or the like.

Examples of the metal fibers can include one or more types of metal fibers selected from a group including aluminum fibers, copper fibers, brass fibers, stainless steel fibers, steel fibers, or the like.

Examples of the glass fibers can include one or more types of glass fibers selected from a group including E-glass, C-glass, S-glass, D-glass, T-glass, quartz glass fibers, borosilicate glass fibers, or the like.

Examples of the organic fibers can include one or more types of organic fibers selected from a group including resin materials such as aramid, PBO (polyparaphenylene benzoxazole), polyphenylene sulfide, polyester, acrylic, polyamide, polyolefin, polyvinyl alcohol, polyarylate, or the like.

A more preferable fiber as the reinforcing fiber included in the fiber-reinforced resin material of the present invention is one or more reinforcing fibers selected from a group including a carbon fiber, a glass fiber, an aramid fiber, a boron fiber, and a basalt fiber, and more preferably in a numerical range of a weight average fiber length described later.

In the present invention, two or more types of reinforcing fibers may be used in combination. In this case, a plurality of types of inorganic fibers may be used in combination, or a plurality of types of organic fibers may be used in combination, or one or two or more types of inorganic fibers may be used in combination with one or two or more types of organic fibers.

Examples of a mode in which the plurality of types of inorganic fibers are used in combination can include a mode in which carbon fibers and metal fibers are used in combination, and a mode in which carbon fibers and glass fibers are used in combination. On the other hand, examples of the mode in which the plurality of types of organic fibers are used in combination can include a mode in which aramid fibers and fibers made of another organic material are used in combination. Further, examples of a mode in which the inorganic fibers and the organic fibers are used in combination can include a mode in which carbon fibers and aramid fibers are used in combination.

In the present invention, it is preferable to use carbon fibers as the reinforcing fibers. This is because by using the carbon fibers, a fiber-reinforced resin material having excellent strength while being lightweight can be obtained. As the carbon fiber, a polyacrylonitrile (PAN) based carbon fiber, a petroleum/coal-pitch based carbon fiber, a rayon based carbon fiber, a cellulose based carbon fiber, a lignin based carbon fiber, a phenol based carbon fiber, a vapor growth carbon fiber, or the like are known. In the present invention, any one of these carbon fibers can be suitably used.

Among these, from the viewpoint of being excellent in tensile strength, the polyacrylonitrile (PAN) based carbon fiber can be preferably used in the present invention. When the PAN based carbon fiber is used as a reinforcing fiber, a tensile modulus thereof is preferably in a numerical range of 100 GPa to 600 GPa, more preferably in a numerical range of 200 GPa to 500 GPa, and even more preferably in a numerical range of 230 GPa to 450 GPa. The tensile strength is preferably in a numerical range of 2000 MPa to 10000 MPa, and more preferably in a numerical range of 3000 MPa to 8000 MPa.

The reinforcing fiber used in the present invention may have a sizing agent adhered to the surface thereof in order to improve the adhesion to the matrix resin. In a case of using the reinforcing fiber with the sizing agent adhered, the type of the sizing agent can be appropriately selected according to the types of the reinforcing fiber and the matrix resin, and is not particularly limited.

The adhesion strength between the reinforcing fiber and the matrix resin is preferably 5 MPa or more in a strand tensile shear test. In addition to the selection of the matrix resin, for example, when the reinforcing fiber is a carbon fiber, the strength can be improved by a method of changing a surface oxygen concentration ratio (O/C) or a method of applying the sizing agent to the carbon fiber to increase the adhesion strength between the carbon fiber and the matrix resin.

In the present invention, when at least a part of the reinforcing fibers is in a form of single fibers, since the reinforcing fibers are excellent in thin-walled moldability, the effect thereof can be remarkably observed. On the other hand, in order to ensure the fluidity of the fiber-reinforced resin material, it is preferable that a part of the reinforcing fibers form a bundle of single fibers. The form of the reinforcing fibers may be in the form of a single fiber or a single-fiber bundle. When both forms coexist in the reinforcing fibers contained in the fiber-reinforced resin material of the present invention, it is possible to have a sufficient mechanical strength, such as a high bending strength per weight per unit area even if the molded article is excellent in thin-walled moldability and is thin-walled. As a result, the obtained fiber-reinforced resin molded article can exhibit the effects of the present invention more sufficiently. The single-fiber bundle means that several or more reinforcing single fibers present in a bundle. The number of reinforcing single fibers forming the single-fiber bundle is preferably 280 or more, more preferably 600 or more. In the present invention, the reinforcing fiber is more preferably a mixture of single-fiber bundles having different numbers of single fibers. When the reinforcing fiber is a mixture of single-fiber bundles having different numbers of single fibers, a more thin-walled molded article can be obtained and the obtained molded article can have sufficient strength, and thus a preferable embodiment is obtained.

The reinforcing fibers contained in the fiber-reinforced resin material of the present invention preferably have a weight average fiber length of 1 to 100 mm, and may be proved as fiber discontinuous fibers having a weight average fiber length of 1 to 100 mm. When a reception average fiber length is within the numerical range, the dimensional accuracy of the fiber-reinforced resin molded article is improved. The weight average fiber length is more preferably 5 mm to 90 mm, and even more preferably 10 mm to 80 mm.

The reinforcing fiber used in the present invention may use not only the discontinuous fibers having a weight average fiber length of 1 to 100 mm or less, which is excellent in tensile strength and isotropy of dimensions in the resin material, but also continuous fibers according to the purpose. When the weight average fiber length of the reinforcing fibers is in the above numerical range, it is possible to have a sufficient mechanical strength, such as a high bending strength per weight per unit area even if the molded article is excellent in thin-walled moldability and is thin-walled. As a result, the obtained fiber-reinforced resin molded article can sufficiently exhibit the effects of the present invention, and is a preferable aspect.

In the present invention, reinforcing fibers having different fiber lengths may be used in combination. In other words, the reinforcing fiber used in the present invention may have a single peak or may have a plurality of peaks in the average fiber length.

The average fiber length of the reinforcing fibers can be determined based on the following Formulas (3) and (4), for example, by measuring fiber lengths of 100 fibers randomly extracted from the fiber-reinforced resin material to 1 mm unit using a caliper or the like. A method of extracting the reinforcing fibers from the fiber-reinforced resin material can be performed by, for example, subjecting the fiber-reinforced resin material to a heat treatment of about 500° C.×1 hour in a heating furnace to remove the resin.

$$\text{Number average fiber length } Ln = \Sigma Li/j \qquad (3)$$

[Here, Li is the fiber length of the reinforcing fibers, and j is the number of reinforcing fibers.]

$$\text{Weight average fiber length } Lw = (\Sigma Li2)/(\Sigma Li) \qquad (4)$$

When the fiber length of the reinforcing fibers is constant, such as when the reinforcing fibers are cut by a rotary cutter, the number average fiber length can be regarded as the weight average fiber length. In the present invention, any one of the number average fiber length and the weight average fiber length may be adopted, but the weight average fiber length is often used to more accurately reflect physical properties of the fiber-reinforced resin material. A single fiber diameter of the reinforcing fiber used in the present invention may be appropriately determined depending on the type of the reinforcing fiber, and is not particularly limited. Generally, when the carbon fibers are used as the reinforcing fibers an average single fiber diameter is preferably in a numerical range of 3 μm to 50 μm, more preferably in a numerical range of 4 μm to 12 μm, and even more preferably in a numerical range of 5 μm to 8 μm.

On the other hand, when the glass fibers are used as reinforcing fibers, for example, an average single fiber diameter is preferably in a numerical range of 3 μm to 30 μm. At the same time, regardless of the type of reinforcing fibers, when the average single fiber diameter of the reinforcing fibers is within the above numerical range, it is possible to have a sufficient mechanical strength, such as a high bending strength per weight per unit area even if the molded article is excellent in thin-walled moldability and is thin-walled. As a result, the obtained fiber-reinforced resin molded article can sufficiently exhibit the effects of the present invention, and is a preferable aspect. More preferable is to employ the single fiber diameter when the carbon fibers are used as the reinforcing fibers.

Here, although the average single fiber diameter refers to the diameter of a single fiber of the reinforcing fibers as in the name, the average single fiber diameter may be abbreviated as the average fiber diameter when the reinforcing fibers are the bundle of single fibers. The average single fiber diameter of the reinforcing fibers can be measured by, for example, the method described in Japanese Industrial Standards (JIS) R7607 (2000). The reinforcing fibers used in the present invention may be in the form of single fibers regardless of the type thereof, or may be in the form of a bundle of a plurality of single fibers.

The reinforcing fibers used in the present invention may be in the form of single fibers, may be in the form of a single-fiber bundle, or may be a mixture of both forms. Preferably, the reinforcing fibers are a mixture of the single fibers and the single-fiber bundles. The single-fiber bundle indicates a state in which two or more single fibers are close to each other by the effects of the sizing agent, electrostatic force, van der Waals force, or the like. When the reinforcing fibers are in the form of the single-fiber bundle, the number of the single fibers configuring each single-fiber bundle may be substantially uniform or different in each single-fiber bundle.

When the reinforcing fibers used in the present invention are in the form of a single-fiber bundle, the number of single fibers configuring each single-fiber bundle is not particularly limited, but is preferably in a range of several to 100,000.

In general, carbon fibers are often manufactured in a form of a single-fiber bundle in which several thousand to several tens of thousands of single fibers are assembled. When the carbon fibers or the like are used as the reinforcing fibers, if they are used in the form of a single-fiber bundle, an entangled portion of the single-fiber bundles is locally thickened, which may make it difficult to obtain the thin-walled fiber-reinforced resin material. Therefore, when the reinforcing fibers in the form of a single-fiber bundle are used, it is usually used by widening or opening a single-fiber bundle.

When the reinforcing fibers in the form of a single-fiber bundle are widened or opened, a ratio of reinforcing fiber bundles (A) (particularly preferably carbon fiber bundles (A)), each composed of single fibers having a number equal to or larger than a critical single fiber number defined by the following Formula (2), to a total amount of the reinforcing fibers is preferably 20 to 99 Vol %.

$$\text{Critical single fiber number} = 600/D \qquad (2)$$

[Here, D is the average fiber diameter (μm) of the reinforcing single fibers.]

The ratio is more preferably 30 to 98 Vol % or more, even more preferably 40 to 95 Vol % or more, particularly preferably 50 to 90 Vol % or more. The reinforcing fibers other than the reinforcing fiber bundle (A) may be in a form of single fibers or a single-fiber bundle (hereafter, may be referred to as reinforcing fibers (B)) configured by single fibers of a number less than the critical single fiber number. Since thickness unevenness of the fiber-reinforced resin material can be reduced by reducing the thickness of the reinforcing fiber bundles (A) configured by a specific number of single fibers or more, and reducing the number of the reinforcing fiber bundles (A) per unit weight (g) of the reinforcing fibers within a specific range, it is possible to obtain a fiber-reinforced resin molded article excellent in mechanical properties even if it is thin-walled by cold press molding.

When the ratio of the content of the reinforcing fiber bundles (A) to the total amount of carbon fibers is 20 Vol % or more, a fiber-reinforced resin material having a high reinforcing fiber volume content can be obtained when the fiber-reinforced resin material of the present invention is molded. On the other hand, the upper limit of the ratio of the content of the reinforcing fiber bundles (A) is preferably 99 Vol %. If the ratio of the content of the reinforcing fiber bundles (A) to the total amount of the reinforcing fibers is 99 Vol % or less, a gap between the reinforcing fibers does not become large, and a fiber-reinforced resin material having excellent mechanical strength can be obtained. The ratio of the content of the reinforcing fiber bundles (A) to the total amount of the reinforcing fibers is more preferably 50 Vol % or more and 98 Vol % or less, even more preferably 60 to 95 Vol %, and particularly preferably 70 to 90 Vol %. At the same time, when the ratio of the reinforcing fiber bundles (A) to the total amount of the reinforcing fibers is in the above numerical range, it is possible to have a sufficient mechanical strength, such as a high bending strength per weight per unit area even if the molded article is excellent in thin-walled moldability and is thin-walled. As a result, the obtained fiber-reinforced resin molded article can sufficiently exhibit the effects of the present invention, and is a preferable aspect.

As described above, since the reinforcing fiber bundles (A) are reinforcing single-fiber bundles, the reinforcing fiber bundles (A) is sometimes referred to as a reinforcing fiber (A) for convenience. Similarly, the average number of single fibers in the reinforcing fiber bundles (A) may be abbreviated as the average fiber number.

(Thermoplastic Resin)

In the fiber-reinforced resin molded article and the fiber-reinforced resin material of the present invention, the thermoplastic resin is contained as the matrix resin. In the present invention, as the matrix resin, a thermosetting resin may be used in combination in a range including the thermoplastic resin as a main component. The thermoplastic resin is not particularly limited, and one having a desired softening temperature can be appropriately selected and used according to the application of the fiber-reinforced resin molded article, or the like. A resin having the softening temperature in a range of 50° C. to 350° C. is usually used as the thermoplastic resin, but is not limited thereto. In the present invention, the softening temperature of the thermoplastic resin refers to a crystal melting temperature of a crystalline thermoplastic resin, a so-called melting point, and a glass transition temperature of an amorphous thermoplastic resin.

Examples of the thermoplastic resin can include one or more types of resin selected from a group including a polystyrene resin and a polyolefin resin other than a polystyrene resin, a thermoplastic polyamide resin, a polyester resin, a polyacetal resin (a polyoxymethylene resin), a polycarbonate resin, a (meth) acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyetherketone resin, a thermoplastic urethane resin, a fluorine-based resin, a thermoplastic polybenzimidazole resin, or the like.

Examples of the polyolefin resin can include one or more types of resin selected from a group including a polyethylene resin, a polypropylene resin, a polybutadiene resin, a polymethylpentene resin, a vinyl chloride resin, a vinylidene chloride resin, a vinyl acetate resin, a polyvinyl alcohol resin, or the like.

Examples of the polystyrene resin can include one or more types of resin selected from a group including a polystyrene resin, an acrylonitrile-styrene resin (an AS resin), an acrylonitrile-butadiene-styrene resin (an ABS resin), or the like.

Examples of the thermoplastic polyamide resin can include one or more types of resin selected from a group including a polyamide 6 resin (nylon 6), polyamide 11 resin (nylon 11), a polyamide 12 resin (nylon 12), a polyamide 46 resin (nylon 46), a polyamide 410 resin (nylon 410), a polyamide 510 resin (nylon 510), a polyamide 66 resin (nylon 66), a polyamide 610 resin (nylon 610), a polyamide 612 resin (nylon 612), a polyamide 1010 resin (nylon 1010), a polyamide 4T resin (nylon 4T), a polyamide 5T resin (nylon 5T), a polyamide 5I resin (nylon 5I), a polyamide 6T resin (nylon 6T), a polyamide 6I resin (nylon 6I), a polyamide MXD6 resin (nylon MXD), or the like.

Examples of the polyester resin can include one or more types of resin selected from a group including a polyethylene terephthalate resin, a polyethylene naphthalate resin, a polyester trimethylene terephthalate resin, a polytrimethylene naphthalate resin, a polybutylene terephthalate resin (a PBT resin), polybutylene naphthalate resin, a polyhexamethylene terephthalate, a liquid crystal polyester, or the like.

Examples of the (meth) acrylic resin can include one or more types of resin selected from a group including a polyacrylic resin, a polymethacrylic resin, a polymethyl acrylate resin, a polymethyl methacrylate resin, or the like.

Examples of the modified polyphenylene ether resin include one or more types of resin selected from a group including a polyphenylene ether resin, a modified polyphenylene ether resin, a polyphenylene sulfide resin, a modified polyphenylene sulfide resin, or the like.

Examples of the thermoplastic polyimide resin can include one or more types of resin selected from a group including a thermoplastic polyimide, a polyamide-imide resin, a polyetherimide resin, a polyester imide resin, or the like.

Examples of the polysulfone resin can include one or more types of resin selected from a group including a polysulfone resin, a modified polysulfone resin, a polyethersulfone resin, or the like.

Examples of the polyetherketone resin can include one or more types of resin selected from a group including a polyetherketone resin, a polyetheretherketone resin, a polyetherketoneketone resin, or the like.

Examples of the fluorine-based resin can include one or more types of resin selected from a group including a polymonofluoroethylene resin, a polydifluoroethylene resin, a polytrifluoroethylene resin, a polytetrafluoroethylene resin, or the like.

The thermoplastic resin used in the present invention may be of only one type, or may be of two or more types. Examples of a mode in which two or more types of thermoplastic resin are used in combination can include a mode in which thermoplastic resins having different softening temperatures are used in combination or a mode in which thermoplastic resins having different average molecular weights are used in combination, and are not limited thereto. When two or more types of thermoplastic resin are used in combination, molding parameters and cooling parameters can be selected in consideration of thermal parameters such as the melting point, crystallization temperature, and glass transition temperature of the thermoplastic resin of a main component. The thermoplastic resin as the main component refers to the thermoplastic resin having the highest blending weight among the two or more types of thermoplastic resin. These molding parameters and cooling parameters are generally derived from the specifications of the device and the equipment, the method of using the equipment and equipment, the type, composition and form of the thermoplastic resin and the reinforcing fibers configuring the resin material, the temperature, the heat capacity, and the weight of the mold. Therefore, when one or more of the above conditions or the like are changed, the parameters vary and are not limited only by the thermal parameters of the thermoplastic resin of the main component.

When two or more types of thermoplastic resin are used, the thermoplastic resin can be appropriately combined, selected and used according to the use of the composite material. Examples of a combination of the thermoplastic resins include using a combination of two or more types of thermoplastic resin selected from a group including a polystyrene resin, a polyolefin resin other than polystyrene resin, a polyamide resin, a polyester resin, a polyacetal resin (a polyoxymethylene resin), a polycarbonate resin, a (meth) acrylic resin, a polyarylate resin, a polyarylene ether resin, a polyimide resin, a polyether nitrile resin, a polyphenylene sulfide resin, a polysulfone resin, a polyketone resin, a polyetherketone resin, a thermoplastic urethane resin, a fluorine-based resin, a thermoplastic polybenzimidazole resin, or the like.

(Method for Manufacturing Fiber-Reinforced Resin Material)

The fiber-reinforced resin material used in the present invention can be manufactured by a known method.

When a thermoplastic resin is used as the matrix resin, for example, the fiber-reinforced resin material can be manufactured by: (1) a step of cutting the reinforcing fibers; (2) a step of opening the cut reinforcing fibers; (3) a step of mixing the opened reinforcing fibers and fibrous or particulate matrix resin to make an isotropic base material; and thereafter heating and compressing the isotropic base material to promote impregnation with the thermoplastic resin, but this is not limited.

The isotropic base material (also called a two-dimensionally and randomly orientated mat), the fiber-reinforced resin material and the manufacturing methods thereof are described in detail in U.S. Pat. No. 8,946,342 specification and US Patent Application Publication 2015/0258762 specification.

For example, a strand made of a plurality of reinforcing fibers is continuously slit along a length direction of the reinforcing fibers if necessary, and then cut into a plurality of narrow strands having a width of 0.05 mm to 5 mm and then continuously cut to an average fiber length of 3 mm to 100 mm. Next, the mat can be obtained by depositing the reinforcing fibers on a breathable conveyor net or the like in a state in which the cut reinforcing fiber is opened to form reinforcing fiber having a smaller number of single fibers by blowing gas to the cut reinforcing fibers. In this case, it is also possible to manufacture the isotropic base material containing the thermoplastic resin by depositing a thermoplastic resin having a granular or short fibrous form on a breathable conveyor net together with reinforcing fibers, or by supplying a molten thermoplastic resin in a film form to a mat-shaped reinforcing fiber layer, and impregnating reinforcing fibers with thermoplastic resin.

The number of single fibers in the reinforcing fibers (A) can be controlled by adjusting the size of the reinforcing fibers used in the cutting step, for example, the width of the reinforcing fibers as a single-fiber bundle or the number of single fibers per width in the above-described method for manufacturing the isotropic base material. Specifically, a method includes widening the width of the reinforcing fibers by widening or the like to arrange it for the cutting process and providing a slitting step before the cutting step. The reinforcing fibers may be slit simultaneously with the cutting.

In the surface of the fiber-reinforced resin material obtained by using the isotropic base material as described above, the reinforcing fibers are not oriented in a specific direction and are dispersed in random directions. That is, such a fiber-reinforced resin material is an in-plane isotropic material. By obtaining the ratio of the tensile modulus in two directions orthogonal to each other, the isotropy of the fiber-reinforced resin material can be quantitatively evaluated. The fiber-reinforced resin molded article of the present invention or the fiber-reinforced resin material may include various fibrous or non-fibrous fillers of organic or inorganic fibers, flame retardants, anti-UV agents, stabilizers, releasing agents, carbon black, pigments, dyes, softeners, plasticizers, or surfactants in a range not impairing the object of the present invention.

Figure 2:
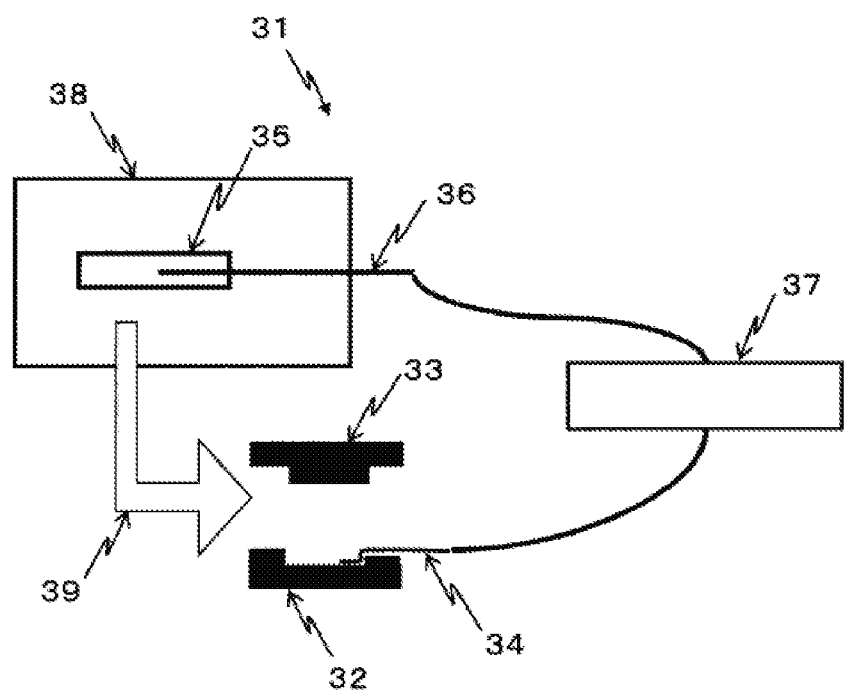
FIG. 2 is an example of a schematic diagram of a device when a charge time, a pressurization time, an air-cooling rate, a cooling rate during pressing, and a flow stop temperature are measured during an operation of heating a resin material by infrared (IR) heating.
Figure 3:
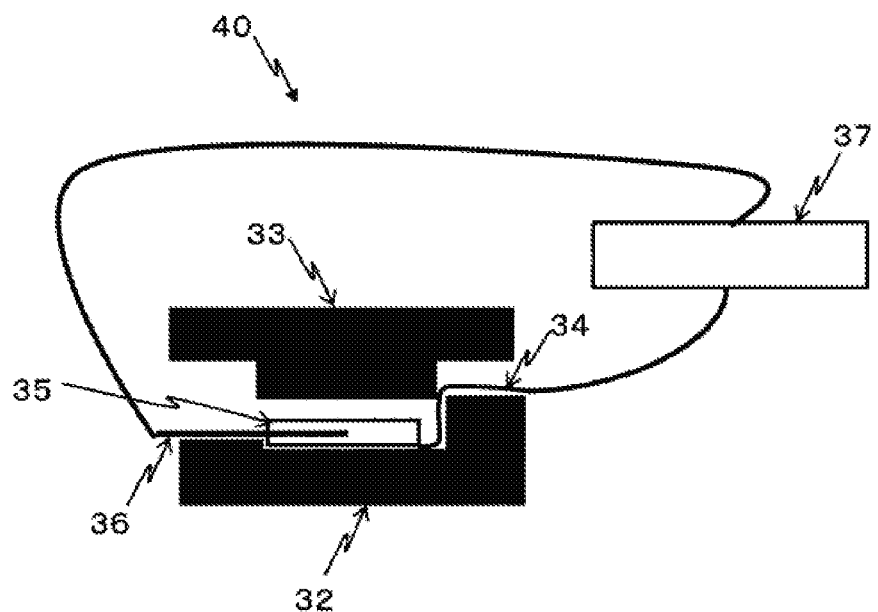
FIG. 3 is an example of a schematic diagram of a device when a charge time, a pressurization time, an air-cooling rate, a cooling rate during pressing, and a flow stop temperature are measured at the moment a shear of a lower mold and a shear of an upper mold meet.

In the present invention, it is necessary to satisfy all numerical ranges of numerical parameters such as the heating temperature, the charge time, the air-cooling rate, the pressurization time, the flow stop temperature, the moldable time, and the like. Therefore, based on the description of each of the numerical parameters, the fiber-reinforced resin material, and the reinforcing fibers and the thermoplastic resin configuring the fiber-reinforced resin material, FIGS. 1 to 3 will be described in more detail centered on FIG. 1. FIG. 1 shows an upper graph 1 showing a temperature change with time, and a lower graph 2 showing a platen position change and a pressure value change with time. FIG. 2 shows a schema 31 of a device where the fiber-reinforced resin material is heated by an infrared oven and conveyed to the mold. FIG. 3 shows a schema 40 of the device at the moment the shear of the upper mold and the shear of the lower mold meet.

In FIG. 1, the graph shown on an upper side (upper graphs) 1 shows the temperature change with time in the fiber-reinforced resin material and the temperature change with time at a specific position of the mold, and the graphs shown on a lower side (lower graphs) 2 shows the platen position change with time and the press pressure change with time of the press molding machine. In the upper graphs, the vertical axis represents temperature 3 and the horizontal axis represents time 4.

One of the upper graphs is a graph 7 showing the temperature change with time (measured by a thermocouple 36 in FIGS. 2 and 3) in the fiber-reinforced resin material. The fiber-reinforced resin material (35 in FIGS. 2 and 3) is heated in an infrared oven (38 in FIG. 2), and as shown by the graph 7, the temperature first increases with time. The temperature at the time when the temperature of the fiber-reinforced resin material rises to the highest is the heating temperature (T) 8. Next, the fiber-reinforced resin material reached the heating temperature is removed from the infrared oven (38 in FIG. 2), and an operation (39 in FIG. 2) arranged in the lower mold (32 in FIGS. 2 and 3) is started. This time point is a start point of the charge time (tc). As a matter of course, the temperature in the fiber-reinforced resin material starts to decrease from this time point. The cooling rate of a time period after this time point corresponds to the air-cooling rate (C1). Further, after the fiber-reinforced resin material is arranged on the lower mold, the platen position of the press molding machine starts to fall. When the upper mold and the resin material is brought into contact, the charge time ends. At the same time from this time point, since the temperature in the resin material starts to decrease at a more rapid rate, the temperature bending point 18 appears in the temperature change with time in the resin material. The cooling rate of a time period after this time point corresponds to the cooling rate during pressing (C2). As time changes, the temperature in the resin material further decreases, reaches the flow stop temperature (Tf) 19, and when the temperature in the resin material further decreases, the cold press molding process ends.

Another graph in the upper graph is a graph 9 that measures the temperature (measured by the thermocouple 34 in FIGS. 2 and 3) at a place where the shears of the upper mold and the lower mold meet, and represents a temperature change with time at this place. The heated resin material (35 in FIGS. 2 and 3) is arranged on the lower mold, the press molding machine operates, and a preset constant temperature is shown until shears of the upper mold and the lower mold meet. That is, up to this time point, the graph 9 representing the temperature change with time is horizontal. At the time point when the shear of the upper mold and the shear of the lower mold meet, very large force is applied to the thermocouple (34 in FIGS. 2 and 3) measuring the temperature at this place, and a time point 10 representing the temperature abnormality is shown. The function of the graph 9 is to display a time point 10 representing this temperature abnormality as described later. The date of the temperature change with time measured by the thermocouples 36 and 34 is stored in a thermocouple data logger (37 in FIGS. 2 and 3).

Then the lower graphs will be explained. In the lower graph, the vertical axis represents the platen position and pressure 5 of the press molding machine, and the horizontal axis represents time 6. One of the lower graphs represents a platen position change with time 11 of the press molding machine. The resin material is arranged on the lower mold and fixed at a constant position until the platen starts to descend. That is, up to this time point, the graph representing the platen position change with time is horizontal. When the press molding machine starts operation, the platen position starts to fall and passes through a platen position 13 corresponding to the previously calculated time point when the shear of the upper mold and the shear of the lower mold meet. Thereafter, the platen position continues to fall. When the platen position reaches a platen position 16 at the time point when the fiber-reinforced resin material stops flowing, the cold press molding process ends.

The other graph of the lower graphs represents a pressure change with time 12 of the press molding machine. A temperature change with time at the place where the shear of the upper mold and the shear of the lower mold meet is measured by 34 in FIGS. 2 and 3, and the graph 9 shows the temperature change with time at this place. The press pressure shows a constant value until the upper mold is brought into contact with the resin material even when the platen position starts to fall. That is, up to this time point, the graph representing the pressure value change with time of the press molding machine is horizontal. The pressure value gradually increases from the time point when the upper mold is brought into contact with the resin material. When the pressure value of the press molding machine exceeds half 15 of the specified pressure value (specified pressing pressure) and reaches the specified pressing pressure value, the graph representing the pressure value change with time of the press molding machine becomes horizontal again. The graph representing the pressure value change with time of the press molding machine becomes horizontal again, and the cold press molding process ends until a certain time elapses. As described above, in the present invention, the time from the time point when the pressure value of the press molding machine starts to rise to the time point when the specified pressing pressure is reached is defined as the pressurization time (tp).

As described above, both of the time point 10 representing the temperature abnormality in the graph 9 of the temperature in the place where the shears of the upper mold and the lower mold meet and the platen position 13 corresponding to the time point when the shear of the upper mold and the shear of the lower mold meet in the graph 11 representing the platen position represent exactly the same point in the cold press molding process. Therefore, the time axis of the upper graph and the lower graph can be aligned for observation and evaluation by matching the scale of the horizontal axis of time using the two points as the reference points. The broken line 14 indicates that the two points can be aligned as a reference representing the same time point.

Figure 5:
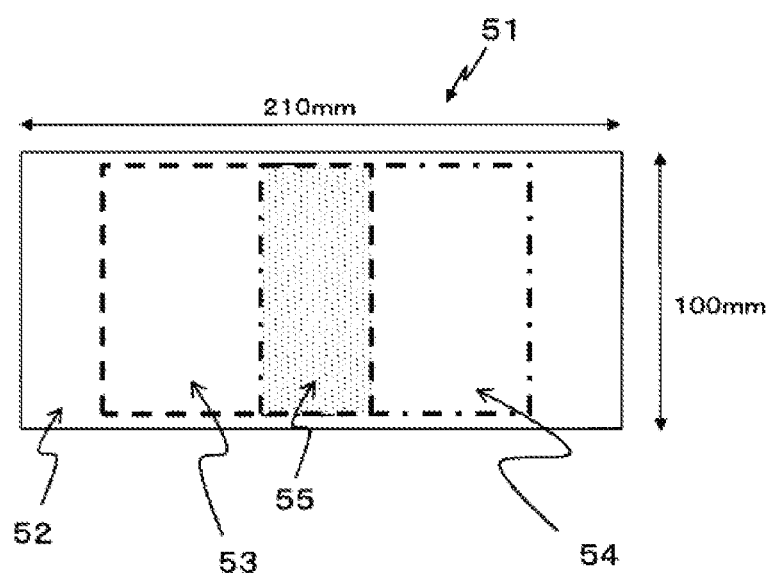
FIG. 5 is an example of a situation where two overlapped fiber-reinforced resin materials are arranged on the lower mold for evaluation of moldability, in which the width of the lower mold in a cavity surface is 210 mm, and the depth thereof is 100 mm.

As described above, the inventors confirmed that the resin material started to flow when the pressure of the press molding machine reaches half of the specified numerical value (the specified pressing pressure) as a result of repeating experiments with changing the configurations, molding conditions, and cooling conditions of the resin material. The flow stop temperature 19 is monitored with the graph 11 of the platen position change with time and recorded. A time point when platen position change with time was 0.01 mm/sec or less was defined as 16, and the temperature in the resin material at this time point was defined as the flow stop temperature (Tf) 19. The time period from a time point when the pressure of the press molding machine reaches half of the specified numerical value (specified pressing pressure) as a start point to a time point when the temperature reaches the flow stop temperature as an end point was defined as the moldable time The manufacturing method according to the present invention has such a characteristic that a fiber-reinforced resin molded article which is excellent in appearance and in moldability to obtain a thin-walled molded article and where a numerical value (weight reduction index) obtained by dividing bending strength by the weight per unit area is large can be obtained. The moldability for obtaining the thinned molded article was evaluated by the following procedure. As shown in FIG. 5, two pieces of the cut fiber-reinforced resin material were superimposed such that an overlapped portion of 90×40 mm can be formed, and cold press molding was performed under a predetermined molding condition. The thickness of the overlapped portion before and after molding was measured at 10 points to evaluate the thin-walled moldability. It was evaluated that the average thickness value of the two overlapped portions was equal to or less than the thickness of the base material before press molding.

The numerical value obtained by dividing the bending strength by the weight per unit area was evaluated by using a value obtained by dividing a numerical value representing the bending strength in MPa by a numerical value representing the weight per unit area in the resin material in $g/mm^2$. This numerical value is referred to as the weight reduction index, and the larger the numerical value, the lighter the weight, the stronger the bending strength, and the molded article can be evaluated as having a light weight and a high bending strength. A molded article having a weight reduction index of 0.15 or more was evaluated as a molded article having a light weight and a high bending strength. The appearance of the molded article was evaluated by visual observation and tactile sensation.

The weight per unit area of the reinforcing fibers and the weight per unit area of the thermoplastic resin in the fiber-reinforced resin molded article of the present invention thus obtained are preferably the same as those of the fiber-reinforced resin material. Further, the thickness of the fiber-reinforced resin molded article is preferably 0.2 to 2.5 mm, more preferably 0.4 to 2.4 mm, even more preferably 0.5 to 2.2 mm, and particularly preferably 0.6 to 2.0 mm. When the thickness of the fiber-reinforced resin molded article is within the numerical range, the obtained molded article is excellent in moldability, light weight and appearance, and can be suitably used in fields such as automobiles, aircraft, and pressure vessels.

EXAMPLE

Examples are shown below, but the present invention is not limited thereto. In particular, although the examples and comparative examples of the present invention are limited to the manufacture of fiber-reinforced resin molded articles having sizes shown in FIGS. 4 and 5 and the following evaluation operations, the content of the present invention is not limited to the manufacture of molded articles having these sizes. Various physical property values in this example were determined according to the following method. Tables 1 to 6 show the configurations, molding conditions of the resin material, and evaluation results of physical properties of the molded article in Examples and Comparative Examples.

1) Volume Fraction of Reinforcing Fibers (Vf) in Fiber-Reinforced Resin Material The weighed fiber-reinforced resin material was heated in a furnace at 500° C. for 1 hour to burn off the matrix resin.

The weight of the reinforcing fiber component and the matrix resin component were calculated by weighing the mass of the resin material sample before and after the heat treatment. Then, after the material of each component was specified, the volume of the reinforcing fiber and the volume of the matrix resin are calculated respectively using the specific gravity of each component, and the volume fraction of reinforcing fibers (Vf) of the fiber-reinforced resin material was calculated in percentage according to the following formula.

$$Vf (\%) = 100 \times \text{volume of reinforcing fiber}/(\text{volume of reinforcing fiber} + \text{volume of thermoplastic resin}) \quad (5)$$

2) Thickness of Base Material

The thickness of the fiber-reinforced resin material was measured using a micrometer.

3) Weight Per Unit Area

The fiber-reinforced resin material was cut into a size of 50 mm×125 mm, the vertical/horizontal dimension and the weight were measured, and the weight per unit area of the fiber-reinforced resin material was calculated according to the following formula.

$$\text{weight per unit area (g/m}^2\text{)} = \text{weight of cut-out product}/(\text{length dimension of cut-out product} \times \text{breath dimension of cut-out product}) \quad (6)$$

4) Melting Point and Glass Transition Temperature of Thermoplastic Resin

The melting point of the fiber-reinforced resin material was measured under a nitrogen atmosphere at a temperature increase rate of 20° C./min using the differential scanning calorimetry (DSC). According to the usual method, the temperature of the peak top associated with the melting of the crystalline component of the thermoplastic resin was determined as the melting point, and the glass transition temperature was calculated according to the method.

5) Heating Temperature

The center temperature of the fiber-reinforced resin material immediately after being heated before the cold press molding was measured using the thermocouple.

6) Thermal Decomposition Rate

Using a fiber-reinforced resin material subjected to bone-dry treatment, a TG-DTA measurement was performed under an air atmosphere at a temperature increase rate of 5° C./min to calculate a thermal decomposition rate at each temperature.

7) Mold Temperature

The surface temperature of the molds used for molding was measured with a contact-type thermometer, and the measured value was described.

8) Specified Pressing Pressure

The numerical value of an existing press pressure gauge in the press molding machine was described.

9) Charge Time, Pressurization Time, Air-Cooling Rate, Cooling Rate During Pressing, Flow Stop Temperature A) Preparing Fiber-Reinforced Resin Material Including Thermocouple The fiber-reinforced resin material cut into a size of 90×97.5 mm was heated, split into two in the thickness direction so as to have the same thickness, and a thermocouple was arranged between the split surfaces. The two split surfaces were matched again, the fiber-reinforced resin material is heated to the heating temperature, and molded at a pressing pressure of 3 MPa. At this time, a spacer was arranged on the lower mold so as to keep a base material thickness. The arranged thermocouple was the thermocouple for temperature measurement 36 in the fiber-reinforced resin material.

B) Thermocouple Arrangement for Time Axis Alignment

The thermocouple 34 is arranged at a place where the shear of the upper mold and the shear of the lower mold meet, and the thermocouple is connected to a data logger (product name) 37. The arranged thermocouple was a thermocouple for time axis alignment.

C) Measuring Operation

The thermocouple 36 for temperature measurement in the fiber-reinforced resin material was connected to the same data logger 37 that was connected to the thermocouple 34 for time axis alignment. The fiber-reinforced resin material 35 including the thermocouple is heated to the heating temperature (T) while the data relating to the temperature change with time is collected from the two thermocouples. The fiber-reinforced resin material is press molded while the platen position change with time and pressing pressure change with time of the press molding machine are monitored. Thus, the temperature of the fiber-reinforced resin material, the temperature change with time at the position where the shear of the upper mold 33 and the shear of the lower mold 32 meet, and the platen position change with time and the pressing pressure change with time of the press molding machine were measured at the same time.

In the time axis of these two changes with time, the time point 10 is aligned with the time point 13. The time point 10 indicates that the temperature measurement value obtained from the thermocouple 34 is an abnormal value at the moment the shear of the upper mold and the shear of the lower mold meet, and the time point 13 indicates the platen position representing a previously confirmed position where the shears meet. Based on this time point, the graph 7 of the temperature change of the fiber-reinforced resin material, the graph 9 of the temperature change at the position where the shear of the upper mold and the shear of the mold lower mold meet, the graph 11 of the platen position change and the graph 12 of the press pressure change of the press molding machine can be obtained as a graph with respect to the time axis of the same time change.

FIGS. 2 and 3 show an overview of the above measurement device, and FIG. 1 shows that a time axis of the temperature change with time of the fiber-reinforced resin material and the position where the shear of the upper mold and the shear of the lower mold meet is adjusted to a time axis of the platen position change with time and the pressing press change with time of the press molding machine.

D) Charge Time

This is the time from the end of heating the fiber-reinforced resin material until the press molding the resin material is substantially started after the heated fiber-reinforced resin material is arranged on the lower mold. In other words, the charge time refers to from the time point when the resin material was heated to the heating temperature to the time point when the upper mold was brought into contact with the resin material after the heated resin material was arranged on the lower mold. Since the resin material is brought into contact with the upper mold, the end of the charge time is also the time point when the cooling rate of the resin material switches from the air-cooling rate to the cooling rate during pressing. It is also the time point represented by the temperature bending point 18 in the graph of the temperature change with time of the resin material in the fiber-reinforced resin material by the thermocouple for temperature measurement 36.

E) Pressurization Time

The time point when the upper mold was brought into contact with the fiber-reinforced resin material is referred as an end of the charge time, and the time from the end of the charge time to the time point when the pressing pressure reached the specified pressure was calculated as the pressurization time.

F) Air-Cooling Rate

The air-cooling rate was calculated by averaging the temperature change with time of the fiber-reinforced resin material from the heating temperature to the end of the charge time.

G) Cooling Rate during Pressing

The cooling rate during pressing was calculated by averaging the temperature change of the fiber-reinforced resin material with time from the time point when the upper mold was brought into contact with the fiber-reinforced resin material (in other words, after the end of the charge time) until the time point when the temperature of the fiber-reinforced resin material reached the flow stop temperature.

H) Flow Stop Temperature

The temperature of the fiber-reinforced resin material at the time when the change in the platen position monitor value of the press molding machine became 0.01 mm/sec or less was set as the flow stop temperature.

10) Calculated Moldable Time

Using the numerical values obtained by the above operation, The moldable time was calculated according to the following Formula (1).

[Equation 4]
$$tm = \frac{T - (C1 \times tc + C2 \times 0.5 \times tp) - Tf}{C2} \quad (1)$$

[In the above Formula (1), tm is a moldable time, T represents the heating temperature, tc represents the charge time, C1 represents the air-cooling rate, tp represents the pressurization time, Tf represents the flow stop temperature, and C2 represents the cooling rate during pressing.]

11) Moldability (Thin-Walled Moldability)

The fiber-reinforced resin material was cut into a size of 90×97.5 mm, and after heating, the long side portions of the two resin members were overlapped by 40 mm, and the size of the overlapped portion was 90×40 mm. Next, the resin material having an overlapped portion was placed on a lower mold and press molding was performed under the molding conditions as shown in Tables 1 to 6 except that the charge time was set to 25 seconds. The thickness of the two overlapped portions of 90×40 mm before and after press molding was measured at 10 points, and the average thickness value of the two overlapped portions was measured. FIG. 5 shows a condition of the two overlapped resin materials being arranged on the lower mold.

In the present invention, if the average value of thicknesses at 10 points of the two overlapped resin materials is equal to or less than the thickness of the base material before press molding, it is evaluated as good (OK), and if the average value of the thicknesses at 10 points exceeds the thickness of the base material before press molding, it is evaluated as not good (NG). In other words, when the thickness value of the base material before press molding was A and the thickness value of the base material after press molding was B, a case where the value of the formula B/A×100 was 100 or less was evaluated as good (OK), and a case where the value exceeded 100 was evaluated as not good (NG).

12) Physical Property (Weight Reduction Index)

The fiber-reinforced resin material cut into 90×200 mm was press molded under the respective conditions shown in Tables 1 to 6, and the bending strength of the obtained fiber-reinforced resin material molded article was measured in accordance with Japanese Industrial Standard: JIS K7074-1988, Japanese Industrial Standard: JIS K7171-2008. In the present invention, a numerical value obtained by dividing the value of the obtained bending strength (unit: MPa) by the weight per unit area (unit: $g/m^2$) of the fiber-reinforced resin material is defined as the weight reduction index, and the weight reduction index was calculated. The unit of the weight reduction index will be omitted for convenience.

The value of the weight reduction index is not affected by the weight per unit area of the fiber-reinforced resin material and the thickness in various fiber-reinforced resin molded articles. The weight per unit area of the fiber-reinforced resin material before molding can be measured more easily than the thickness, and it is possible to easily compare the resin materials having different thickness at the time of design. As a result, a fiber-reinforced resin molded article having a light weight and a high bending strength can be evaluated. In the present invention, a case where the weight reduction index is 0.15 or more is evaluated as good (OK), and a case where the weight reduction index is less than 0.15 is evaluated as not good (NG).

When the mold temperature is higher than 150° C., the heating source of the heater was cut off while the mold was closed after being molded under the conditions described in Tables 1 to 6. Then the mold was cooled until the mold temperature reached 150° C. or lower, the mold was opened after cooling, and the fiber-reinforced resin molded article was taken out from the mold.

13) Appearance

The fiber-reinforced resin molded article obtained in 12) was evaluated for appearance according to the following criteria.

Good (OK);
The floating of the carbon fiber was inconspicuous by visual observation, and the tactile sensation of touching a surface of the molded article with a finger was smooth.

Not Good (NG);
The floating of the carbon fiber was conspicuous by visual observation, and the tactile sensation of touching the surface of the molded article with a finger was unsmooth.

14) Calculating Ratio of Carbon Fiber Bundles (A) to Fiber-Reinforced Resin Material The ratio of the carbon fiber bundles (A) contained in the fiber-reinforced resin material was determined as follows.

The fiber-reinforced resin material was cut into a size of 50 mm×50 mm and heated in a furnace at 500° C. for about 1 hour to completely remove the matrix resin. Thereafter, the fiber bundles were all taken out with tweezers, and the length (Li), the mass (Wi), and the number of fiber bundles (I) of the fiber bundles were measured. When the fiber bundles are too small to be taken out by the tweezers, the mass was finally measured (referred to as Wk). A balance capable of measuring up to $1/100$ mg was used to measure the mass.

After the measurement, the following calculations were performed. Based on the fineness (F) of the carbon fiber used, the number of fibers (Ni) of each fiber bundle was determined by the following formula.

$$\text{Number of fibers } (Ni) = Wi/(Li \times F) \quad (7)$$

The average fiber number (N) in the carbon fiber bundles (A) was determined by the following formula.

$$N = \Sigma Ni/I \quad (8)$$

The volume ratio (VR) of the carbon fiber bundles (A) to the entire reinforcing fibers was determined by the following formula using the density (p) of the carbon fiber.

$$VR=\Sigma(Wi/\rho)\times 100/((Wk+\Sigma Wi)/\rho) \quad (9)$$

15) Weight Average Carbon Fiber Length of Reinforcing Fibers

After the matrix resin was completely removed from the fiber-reinforced resin material by the above heat treatment operation, the average fiber length of the reinforcing fibers was measured by randomly extracting the fiber length of 100 reinforcing fibers with a caliper or the like up to a unit of 1 mm. In general, when the fiber length of each carbon fiber is Li, the number average fiber length Ln and the weight average fiber length Lw in the fiber-reinforced resin material are determined by the following Formulas (10) and (11). The unit of the number average fiber length Ln and the weight average fiber length Lw is mm.

$$Ln=\Sigma Li/I \quad (10)$$

$$Lw=(\Sigma Li2)/(\Sigma Li) \quad (11)$$

Here, "I" represents the number of carbon fibers of which the fiber length is measured.

Manufacturing Fiber-Reinforced Resin Material

Manufacturing Example 1

A PAN-based carbon fiber "Tenax" (registered trademark) STS40-24KS (average single fiber diameter 7 μm, single fiber count 24,000) manufactured by Toho Tenax Co., Ltd. and treated with a nylon sizing agent was used as the reinforcing fiber, and Nylon 6 resin, A1030 (trade name) manufactured by Unitika Ltd. was used as the matrix resin. According to the method described in US Patent Application Publication No. 2015/0152231 specification, an isotropic base material is prepared, wherein a weight per unit area of carbon fibers is 814 g/m², weight per unit area of a nylon 6 resin is 963 g/m², and carbon fibers having a weight average fiber length of 20 mm are two-dimensionally and randomly oriented in an isotropic plane.

The obtained isotropic base material was heated and pressed at a pressure of 2.0 MPa for 15 minutes in a press apparatus heated to 290° C. by using a mold having a recess at the upper portion to obtain a fiber-reinforced resin material having a base material thickness of 1.3 mm where the reinforcing fibers were two-dimensionally and randomly oriented. The obtained resin material had a volume fraction of reinforcing fibers (Vf) of 35%, and as a result of measurement with DSC, the melting point of the thermoplastic resin configuring the obtained resin material was 220° C.

The weight average fiber length of the reinforcing fibers contained in the fiber-reinforced resin material was 20 mm, the critical single fiber number was 86, and the ratio of the reinforcing fiber (A) composed of the carbon single fibers in a number equal to or larger than the critical single fiber number in the total amount of the reinforcing fibers was 85 vol %. As reinforcing fibers other than the reinforcing fiber (A) in the fiber-reinforced resin material, it was confirmed that a bundle consisting of carbon single fibers in a number less than the critical single fiber number and carbon fibers in the form of single fibers were also present. The reinforcing fiber (A) or the bundle of carbon single fibers in a number less than the critical single fiber number was a mixture of carbon fibers having different number of single fibers.

Manufacturing Example 2

The fiber-reinforced resin material was manufactured in the same manner as in Manufacturing Example 1 expect that the weight per unit area of carbon fibers was 1065 g/m², weight per unit area of a nylon 6 resin was 1260 g/m², and the temperature of the press machine was 280° C. As a result, a fiber-reinforced resin material where the base material thickness was 1.7 mm, the volume fraction of reinforcing fibers (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fibers (A) composed of the carbon single fibers in a number equal to or larger than the critical single fiber number to the total amount of reinforcing fibers, were the same as in Manufacturing Example 1.

Manufacturing Example 3

The fiber-reinforced resin material was manufactured in the same manner as in Manufacturing Example 1 expect that the weight per unit area of carbon fibers was 1253 g/m², weight per unit area of a nylon 6 resin was 1482 g/m², and the temperature of the press machine was 270° C. As a result, a fiber-reinforced resin material where the base material thickness was 2.0 mm, the volume fraction of reinforcing fibers (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 4

The fiber-reinforced resin material was manufactured in the same manner as in Manufacturing Example 1 expect that the weight per unit area of carbon fibers was 1660 g/m², weight per unit area of a nylon 6 resin was 1964 g/m², and the temperature of the press machine was 260° C. and the heating time was 5 minutes. As a result, a fiber-reinforced resin material where the base material thickness was 2.65 mm, the volume fraction of reinforcing fibers (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 5

The manufacture was performed in the same manner as in Manufacturing Example 1 expect that the weight per unit area of carbon fibers was 349 g/m², weight per unit area of a nylon 6 resin was 1260 g/m², and the heating time of the press machine was 5 minutes. As a result, a fiber-reinforced resin material where the base material thickness was 1.3 mm, the volume fraction of reinforcing fibers (Vf)=15%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 6

The fiber-reinforced resin material was manufactured in the same manner as in Manufacturing Example 1 expect that the weight per unit area of carbon fibers was 501 g/m$^2$, weight per unit area of a nylon 6 resin was 593 g/m$^2$, and the heating temperature of the press machine was 300° C. As a result, a fiber-reinforced resin material where the base material thickness was 0.8 mm, the volume fraction of reinforcing fibers (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 7

The fiber-reinforced resin material was manufactured in the same manner as in Manufacturing Example 1 expect that the weight per unit area of carbon fibers was 1378 g/m$^2$, weight per unit area of a nylon 6 resin was 1630 g/m$^2$, and the heating temperature of the press machine was 270° C. As a result, a fiber-reinforced resin material where the base material thickness was 2.2 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 8

The fiber-reinforced resin material was manufactured in the same manner as in Manufacturing Example 1 expect that PBT resin (polybutylene terephthalate resin) manufactured by Polyplastics Co., Ltd. was used as the matrix fiber, 300 FP (trade name) was used, the weight per unit area of carbon fibers was adjusted to 814 g/m$^2$, and weight per unit area of the PBT resin was adjusted to 1166 g/m$^2$. As a result, a fiber-reinforced resin material where the base material thickness was 1.3 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1. As a result of measurement with DSC, the melting point of the thermoplastic resin configuring the obtained resin material was 224° C.

Manufacturing Example 9

The fiber-reinforced resin material was manufactured in the same manner as in Manufacturing Example 1 expect that the weight per unit area of carbon fibers was 533 g/m$^2$, weight per unit area of a nylon 6 resin was 630 g/m$^2$, and the heating temperature of the press machine was 300° C. As a result, a fiber-reinforced resin material where the base material thickness was 0.85 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 10

The fiber-reinforced resin material was manufactured in the same manner as in Manufacturing Example 1 expect that the weight per unit area of carbon fibers was 439 g/m$^2$, weight per unit area of a nylon 6 resin was 519 g/m$^2$, and temperature of the press machine was 300° C. As a result, a fiber-reinforced resin material where the base material thickness was 0.7 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 11

The fiber-reinforced resin material was manufactured in the same manner as in Manufacturing Example 1 expect that the weight per unit area of carbon fibers was 313 g/m$^2$, weight per unit area of a nylon 6 resin was 371 g/m$^2$, and the heating temperature of the press machine was 300° C. As a result, a fiber-reinforced resin material where the base material thickness was 0.7 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 12

The manufacture was performed in the same manner as in Manufacturing Example 1 expect that the weight per unit area of carbon fibers was 349 g/m$^2$, weight per unit area of the PBT resin was 1525 g/m$^2$, and the heating time of the press machine was 5 minutes. As a result, a fiber-reinforced resin material where the base material thickness was 1.3 mm, the volume fraction of reinforcing fibers (Vf)=15%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 13

The fiber-reinforced resin material was manufactured in the same manner as in Manufacturing Example 1 expect that the weight per unit area of carbon fibers was 1065 g/m$^2$, weight per unit area of the PBT resin was 1525 g/m$^2$, and the heating temperature of the press machine was 280° C. As a result, a fiber-reinforced resin material where the base material thickness was 1.7 mm, the volume fraction of reinforcing fiber (Vf)=35%, and the reinforcing fibers were two-dimensionally and randomly oriented was obtained. The physical properties such as: the weight average fiber length of the reinforcing fiber contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 14

The fiber-reinforced resin material was manufactured in the same manner as in Manufacturing Example 1 expect that the weight per unit area of carbon fibers was 439 g/m$^2$, weight per unit area of the PBT resin was 628 g/m$^2$, and the heating temperature of the press machine was 300° C. As a result, a fiber-reinforced resin material where the base material thickness was 0.7 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Example 15

The fiber-reinforced resin material was manufactured in the same manner as in Manufacturing Example 1 expect that the weight per unit area of carbon fibers was 313 g/m$^2$, weight per unit area of the PBT resin was 449 g/m$^2$, and the heating temperature of the press machine was 300° C. As a result, a fiber-reinforced resin material where the base material thickness was 0.5 mm, the volume fraction of reinforcing fiber (Vf)=35%, and the reinforcing fibers were two-dimensionally and randomly oriented was obtained. The physical properties such as: the weight average fiber length of the reinforcing fibers contained in the fiber-reinforced resin material; the critical single fiber number; and the ratio of the reinforcing fiber (A) composed of the carbon single fibers in a number equal to or larger than the critical single fiber number to the total amount of reinforcing fibers, were the same as in Manufacturing Example 1.

Manufacturing Fiber-Reinforced Resin Molded Article

Example 1

The fiber-reinforced resin material was cut into 90×97.5 mm in Manufacturing Example 1 to arrange the thermocouple by the method described above in the specification. Next, a mold having an upper mold and a lower mold of a flat plate having a 210 mm×90 mm cavity where the thermocouple for time axis alignment was arranged by the method described above in the specification as shown in FIG. 4 was prepared. As shown in Table 1, the resin material was cold press molded at a heating temperature of 310° C., a mold temperature of 200° C., a charge time of 25 seconds, a pressurization time of 1 second, and a specified pressing pressure of 20 MPa, the air-cooling rate, the cooling rate during pressing and the moldable time of the resin material were measured, and after 60 seconds from the end of the cold press molding, the mold temperature was set to 150° C. and the molded article was taken out from the mold. The air-cooling rate of the resin material was 2.7° C./sec, the cooling rate during pressing was 10.0° C./sec, the flow stop temperature was 235° C., and the calculated moldable time was 0.25 second. The thermal decomposition rate of the resin material at 310° C. was 0.15 wt %/sec.

As a result of evaluating the moldability by the method described in the specification under the above molding conditions, the thickness of the two overlapped portions was 1.2 mm That is, the thickness was 92% of a thickness of one base material (1.3 mm), thinner than the base material thickness of the resin material before cold press molding, and showed excellent moldability. Subsequently, the bending strength of the molded article molded under the above-described molding conditions was measured using the resin material of Manufacturing Example 1 cut into 90 mm×97.5 mm. The bending strength was 440 MPa, and the weight reduction index obtained by dividing the bending strength (MPa) by the value of the weight per unit area (g/m$^2$) of the resin material was 0.25, and thus the properties excellent in light weight and strength were indicated. The visual appearance of the molded article was uniform and smooth without the float of the carbon fiber, and the surface of the molded article was smooth with a finger touch and showed an excellent appearance. The results were shown in Table 1.

Examples 2 to 17, and Comparative Examples 1 to 15

As shown in Tables 1 to 6, various types of the fiber-reinforced resin materials (types of manufacturing examples) in which types of the thermoplastic resins, the volume fraction of reinforcing fibers (Vf), and the base material thickness were changed; molding conditions such as: heating temperature; cooling rate; and flow stop temperature were employed. Further, the same operation as in Example 1 was performed except that the fiber-reinforced resin material was cold press molded to obtain the fiber-reinforced resin molded article such that the moldable time calculated from these values becomes the values described in Tables 1 to 6. Tables 1 to 6 showed the evaluation results of moldability, light weight and appearance in Examples and Comparative Examples.

TABLE 1

| | | | Example 1 | Example 2 | Example 3 | Example 4 | Example 5 | Example 6 |
|---|---|---|---|---|---|---|---|---|
| Fiber-Reinforced Resin Material | Type of Manufacturing Example | — | Manufacturing Example 1 | Manufacturing Example 2 | Manufacturing Example 1 | Manufacturing Example 1 | Manufacturing Example 1 | Manufacturing Example 3 |
| | Type of Thermoplastic Resin | — | nylon 6 | nylon 6 | nylon 6 | nylon 6 | nylon 6 | nylon 6 |
| | Volume Fraction of Reinforcing Fibers (Vf) | vol % | 35 | 35 | 35 | 35 | 35 | 35 |
| | Base Material Thickness: A | mmt | 1.3 | 1.7 | 1.3 | 1.3 | 1.3 | 2.0 |
| | Weight per Unit Area | g/m$^2$ | 1778 | 2325 | 1778 | 1778 | 1778 | 2735 |
| Molding Condition | Heating Temperature | °C. | 310 | 290 | 290 | 310 | 310 | 290 |
| | Mold Temperature | °C. | 200 | 175 | 150 | 200 | 200 | 200 |
| | Thermal Decomposition Rate | wt %/sec | 0.15 | 0.06 | 0.15 | 0.15 | 0.15 | 0.30 |
| | Charge Time | sec | 25 | 25 | 10 | 25 | 25 | 25 |
| | Pressurization Time | sec | 1.0 | 1.0 | 1.0 | 0.1 | 1.0 | 1.0 |
| | Specified Pressing Pressure | MPa | 20 | 20 | 20 | 20 | 10 | 20 |
| Cooling Rate | Air-Cooling Rate | °C./sec | 2.7 | 2.1 | 2.7 | 2.7 | 2.7 | 1.7 |
| | Cooling Rate during Pressing | °C./sec | 10.0 | 14.0 | 52.8 | 10.0 | 10.0 | 5.3 |
| | Flow Stop Temperature | °C. | 235 | 218 | 220 | 235 | 235 | 216 |
| | Calculated Moldable Time | sec | 0.25 | 0.89 | 0.31 | 0.70 | 0.25 | 5.44 |
| Moldability | Determination | — | OK | OK | OK | OK | OK | OK |
| | Thickness when two portions are overlapped: B | mm | 1.2 | 1.45 | 1.2 | 1.1 | 1.3 | 1.6 |
| | B/A × 100 | % | 92 | 85 | 92 | 85 | 100 | 80 |
| Light Weight | Determination | — | OK | OK | OK | OK | OK | OK |
| | bending Strength | MPa | 440 | 440 | 440 | 440 | 440 | 440 |
| | Weight Reduction Index (Bending Strength/Weight per Unit Area) | — | 0.25 | 0.19 | 0.25 | 0.25 | 0.25 | 0.16 |
| | Appearance | Visual/Tactile Sensation Determination | OK | OK | OK | OK | OK | OK |

TABLE 2

| | | | Example 7 | Example 8 | Example 9 | Example 10 | Example 11 | Example 12 |
|---|---|---|---|---|---|---|---|---|
| Fiber-Reinforced Resin Material | Type of Manufacturing Example | — | Manufacturing Example 7 | Manufacturing Example 1 | Manufacturing Example 8 | Manufacturing Example 8 | Manufacturing Example 8 | Manufacturing Example 1 |
| | Type of Thermoplastic Resin | — | nylon 6 | nylon 6 | PBT | PBT | PBT | nylon 6 |
| | Volume Fraction of Reinforcing Fibers (Vf) | vol % | 35 | 35 | 35 | 35 | 35 | 35 |
| | Base Material Thickness: A | mmt | 2.2 | 1.3 | 1.3 | 1.3 | 1.3 | 1.3 |
| | Weight per Unit Area | g/m$^2$ | 3009 | 1778 | 1981 | 1981 | 1981 | 1778 |
| Molding Condition | Heating Temperature | °C. | 275 | 320 | 275 | 310 | 320 | 320 |
| | Mold Temperature | °C. | 200 | 150 | 200 | 200 | 150 | 200 |
| | Thermal Decomposition Rate | wt %/sec | 0.15 | 0.20 | 0.11 | 0.11 | 0.23 | 0.15 |
| | Charge Time | sec | 10 | 25 | 15 | 25 | 25 | 33 |
| | Pressurization Time | sec | 0.5 | 1.0 | 1.0 | 1.0 | 1.0 | 1.0 |
| | Specified Pressing Pressure | MPa | 20 | 20 | 20 | 20 | 20 | 20 |
| Cooling Rate | Air-Cooling Rate | °C./sec | 1.3 | 2.7 | 2.7 | 2.7 | 2.7 | 2.7 |
| | Cooling Rate during Pressing | °C./sec | 3.7 | 52.8 | 10.0 | 10.0 | 52.8 | 10.0 |
| | Flow Stop Temperature | °C. | 200 | 220 | 225 | 225 | 220 | 225 |
| | Calculated Moldable Time | sec | 16.51 | 0.12 | 0.45 | 1.25 | 0.12 | 0.09 |
| Moldability | Determination | — | OK | OK | OK | OK | OK | OK |
| | Thickness When Two Portions are Overlapped: B | mm | 1.9 | 1.2 | 1.2 | 1.1 | 1.2 | 1.3 |
| | B/A × 100 | % | 85 | 94 | 90 | 82 | 94 | 100 |
| Light Weight | Determination | — | OK | OK | OK | OK | OK | OK |
| | bending Strength | MPa | 440 | 430 | 380 | 380 | 370 | 440 |
| | Weight Reduction Index (Bending Strength/Weight per Unit Area) | — | 0.15 | 0.24 | 0.19 | 0.19 | 0.19 | 0.25 |
| | Appearance | Visual/Tactile Sensation Determination | OK | OK | OK | OK | OK | OK |

TABLE 3

| | | | Example 13 | Example 14 | Example 15 | Example 16 | Example 17 |
|---|---|---|---|---|---|---|---|
| Fiber-Reinforced Resin Material | Type of Manufacturing Example | — | Manufacturing Example 9 | Manufacturing Example 1 | Manufacturing Example 10 | Manufacturing Example 13 | Manufacturing Example 14 |
| | Type of Thermoplastic Resin | — | nylon 6 | nylon 6 | nylon 6 | PBT | PBT |
| | Volume Fraction of Reinforcing Fibers (Vf) | vol % | 35 | 35 | 35 | 35 | 35 |
| | Base Material Thickness: A | mmt | 0.85 | 1.3 | 0.7 | 1.7 | 0.7 |
| | Weight per Unit Area | g/m$^2$ | 1162 | 1778 | 957 | 2590 | 1066 |
| Molding Condition | Heating Temperature | °C. | 320 | 310 | 320 | 310 | 320 |
| | Mold Temperature | °C. | 200 | 200 | 200 | 200 | 200 |
| | Thermal Decomposition Rate | wt %/sec | 0.20 | 0.15 | 0.20 | 0.11 | 0.23 |
| | Charge Time | sec | 15 | 20 | 10 | 25 | 10 |
| | Pressurization Time | sec | 1.0 | 1.0 | 1.0 | 1.0 | 1.0 |
| | Specified Pressing Pressure | MPa | 20 | 20 | 20 | 20 | 20 |
| Cooling Rate | Air-Cooling Rate | °C./sec | 5.7 | 2.7 | 6.4 | 2.1 | 6.5 |
| | Cooling Rate during Pressing | °C./sec | 15.0 | 10.0 | 18.0 | 9.0 | 18.5 |
| | Flow Stop Temperature | °C. | 225 | 230 | 245 | 205 | 245 |
| | Calculated Moldable Time | sec | 0.13 | 2.10 | 0.11 | 5.33 | 0.04 |
| Moldability | Determination | — | OK | OK | OK | OK | OK |
| | Thickness When Two Portions are Overlapped: B | mm | 0.7 | 1.1 | 0.7 | 1.4 | 0.7 |
| | B/A × 100 | % | 88 | 81 | 94 | 80 | 93 |
| Light Weight | Determination | — | OK | OK | OK | OK | OK |
| | Bending Strength | MPa | 430 | 440 | 430 | 380 | 370 |
| | Weight Reduction Index (Bending Strength/Weight per Unit Area) | — | 0.37 | 0.25 | 0.45 | 0.15 | 0.35 |
| | Appearance | Visual/Tactile Sensation Determination | OK | OK | OK | OK | OK |

TABLE 4

| | | | Comparative Example 1 | Comparative Example 2 | Comparative Example 3 | Comparative Example 4 | Comparative Example 5 | Comparative Example 6 |
|---|---|---|---|---|---|---|---|---|
| Fiber-Reinforced Resin Material | Type of Manufacturing Example | — | Manufacturing Example 1 | Manufacturing Example 1 | Manufacturing Example 1 | Manufacturing Example 1 | Manufacturing Example 1 | Manufacturing Example 1 |
| | Type of Thermoplastic Resin | — | nylon 6 | nylon 6 | nylon 6 | nylon 6 | nylon 6 | nylon 6 |
| | Volume Fraction of Reinforcing Fibers (Vf) | vol % | 35 | 35 | 35 | 35 | 35 | 35 |
| | Base Material Thickness: A | mmt | 1.3 | 1.3 | 1.3 | 1.3 | 1.3 | 1.3 |
| | Weight per Unit Area | g/m$^2$ | 1778 | 1778 | 1778 | 1778 | 1778 | 1778 |
| Molding Condition | Heating Temperature | °C. | 250 | 330 | 290 | 310 | 310 | 310 |
| | Mold Temperature | °C. | 200 | 200 | 150 | 200 | 200 | 200 |
| | Thermal Decomposition Rate | wt %/sec | 0.01 | 0.30 | 0.15 | 0.15 | 0.15 | 0.15 |
| | Charge Time | sec | 15 | 15 | 5 | 40 | 25 | 25 |
| | Pressurization Time | sec | 1.0 | 1.0 | 1.0 | 1.0 | 3.0 | 1.0 |
| | Specified Pressing Pressure | MPa | 20 | 20 | 20 | 20 | 20 | 5 |
| Cooling Rate | Air-Cooling Rate | °C./sec | 2.7 | 2.7 | 2.7 | 2.7 | 2.7 | 2.7 |
| | Cooling Rate during Pressing | °C./sec | 15.1 | 7.0 | 52.8 | 10.0 | 10.0 | 10.0 |
| | Flow Stop Temperature | °C. | 239 | 218 | 220 | 235 | 237 | 238 |
| | Calculated Moldable Time | sec | −2.45 | 9.71 | 0.57 | −3.80 | −0.95 | −0.05 |
| Moldability | Determination | — | NG | OK | Cannot be Charged | NG | NG | NG |
| | Thickness When Two Portions are Overlapped: B | mm | 1.55 | 1 | | 1.7 | 1.5 | 1.4 |
| | B/A × 100 | % | 119 | 77 | | 131 | 115 | 108 |
| Light Weight | Determination | — | OK | OK | | OK | OK | OK |
| | Bending Strength | MPa | 440 | 420 | | 440 | 440 | 410 |
| | Weight Reduction Index (Bending Strength/Weight per Unit Area) | — | 0.25 | 0.24 | | 0.25 | 0.25 | 0.23 |
| | Appearance | Visual/Tactile Sensation Determination | NG | NG | | NG | NG | OK |

TABLE 5

|  |  |  | Comparative Example 7 | Comparative Example 8 | Comparative Example 9 | Comparative Example 10 | Comparative Example 11 | Comparative Example 12 |
|---|---|---|---|---|---|---|---|---|
| Fiber-Reinforced Resin Material | Type of Manufacturing Example | — |  | Manufacturing Example 4 | Manufacturing Example 5 | Manufacturing Example 6 | Manufacturing Example 8 | Manufacturing Example 8 | Manufacturing Example 1 |
|  | Type of Thermoplastic Resin | — | nylon 6 | nylon 6 | nylon 6 | PBT | PBT | nylon 6 |
|  | Volume Fraction of Reinforcing Fibers (Vf) | vol % | 35 | 15 | 35 | 35 | 35 | 35 |
|  | Base Material Thickness: A | mmt | 2.65 | 1.3 | 0.8 | 1.3 | 1.3 | 1.3 |
|  | Weight per Unit Area | g/m² | 3624 | 1609 | 1094 | 1981 | 1981 | 1778 |
| Molding Condition | Heating Temperature | °C. | 290 | 290 | 310 | 255 | 330 | 310 |
|  | Mold Temperature | °C. | 200 | 150 | 200 | 150 | 150 | 200 |
|  | Thermal Decomposition Rate | wt %/sec | 0.30 | 0.15 | 0.15 | 0.02 | 0.23 | 0.15 |
|  | Charge Time | sec | 25 | 25 | 25 | 25 | 25 | 25 |
|  | Pressurization Time | sec | 1.0 | 1.0 | 1.0 | 1.0 | 1.0 | 0.01 |
|  | Specified Pressing Pressure | MPa | 20 | 20 | 20 | 20 | 20 | 20 |
| Cooling Rate | Air-Cooling Rate | °C./sec | 0.9 | 1.2 | 6.3 | 2.7 | 2.7 | 2.7 |
|  | Cooling Rate during Pressing | °C./sec | 5.6 | 3.7 | 29.5 | 52.8 | 52.8 | It was difficult to mold since mold galling occurred. |
|  | Flow Stop Temperature | °C. | 211.7 | 190 | 252 | 238 | 220 |  |
|  | Calculated Moldable Time | sec | 9.46 | 18.42 | −3.87 | −1.46 | 0.30 |  |
| Moldability | Determination | — | OK | Molding was impossible since a burr is generated. | NG | OK | OK |  |
|  | Thickness When Two Portions are Overlapped: B | mm | 2 |  | 1.65 | 1.5 | 1.2 |  |
|  | B/A × 100 | % | 75 |  | 206 | 115 | 94 |  |
| Light Weight | Determination | — | NG |  | NG | OK | OK |  |
|  | Bending Strength | MPa | 440 |  | 150 | 380 | 280 |  |
|  | Weight Reduction Index (Bending Strength/Weight per Unit Area) | — | 0.12 |  | 0.14 | 0.19 | 0.14 |  |
|  | Appearance | Visual/Tactile Sensation Determination | OK |  | NG | NG | OK |  |

TABLE 6

|  |  |  | Comparative Example 13 | Comparative Example 14 | Comparative Example 15 |
|---|---|---|---|---|---|
| Fiber-Reinforced Resin Material | Type of Manufacturing Example | — | Manufacturing Example 11 | Manufacturing Example 12 | Manufacturing Example 15 |
|  | Type of Thermoplastic Resin | — | nylon 6 | PBT | PBT |
|  | Volume Fraction of Reinforcing Fibers (Vf) | vol % | 10 | 15 | 35 |
|  | Base Material Thickness: A | mmt | 0.5 | 1.3 | 0.5 |
|  | Weight per Unit Area | g/m² | 684 | 1874 | 762 |
| Molding Condition | Heating Temperature | °C. | 320 | 290 | 320 |
|  | Mold Temperature | °C. | 200 | 150 | 200 |
|  | Thermal Decomposition Rate | wt %/sec | 0.2 | 0.15 | 0.23 |
|  | Charge Time | sec | 10 | 25 | 10 |
|  | Pressurization Time | sec | 1.0 | 1.0 | 1.0 |
|  | Specified Pressing Pressure | MPa | 20 | 20 | 20 |
| Cooling Rate | Air-Cooling Rate | °C./sec | 10.3 | 1.3 | 10.5 |
|  | Cooling Rate during Pressing | °C./sec | 23.0 | 3.9 | 23.5 |
|  | Flow Stop Temperature | °C. | 255 | 190 | 260 |
|  | Calculated Moldable Time | sec | −2.15 | 16.81 | −2.41 |
| Moldability | Determination | — | OK | Molding was impossible since a burr is generated. | OK |
|  | Thickness When Two Portions are Overlapped: B | mm | 0.6 |  | 0.6 |
|  | B/A × 100 | % | 115 |  | 115 |
| Light Weight | Determination | — | OK |  | OK |
|  | Bending Strength | MPa | 430 |  | 370 |
|  | Weight Reduction Index (Bending Strength/Weight per Unit Area) | — | 0.63 |  | 0.49 |
|  | Appearance | Visual/Tactile Sensation Determination | OK |  | OK |

Example 2 in which the base material thickness was 1.7 mm showed excellent moldability even when the heating temperature and the mold temperature were set lower than those in Example 1, and the light weight and appearance of the obtained molded article were comparable to those obtained in Example 1. In Example 3 in which the heating temperature and the mold temperature were lower than those in Example 1 and the charge time was set shorter, the calculated moldable time was the same as that in Example 1, the moldability also showed an excellent level equivalent to that in Example 1, and the obtained molded article was excellent in light weight and appearance. In Example 4 in which the pressurizing time was set shorter than that in Example 1, the calculated value of moldable time was larger than that in Example 1, the moldability was better than that in Example 1, and the obtained molded article was excellent in light weight and appearance. In Example 5 in which the prescribed pressing pressure was lower than that in Example 1, it can be said that the thickness of the two overlapped portions was crushed to the thickness of the base material, excellent moldability was shown, and the obtained molded article was excellent in light weight and appearance. In Example 6 using a resin material having a base material thickness of 2.0 mm, which is a slightly thick base material, even when the heating temperature was lower than that in Example 1 and the mold temperature was the same as that in Example 1, since the resin material having a large thickness and a large weight per unit area was used, the air-cooling rate and the cooling rate during pressing can be made smaller in comparison with Example 1. As a result, it was possible to secure a moldable time sufficiently longer than that in Example 1, and the obtained molded article had excellent moldability, light weight and appearance.

Example 7 was an embodiment in which the air-cooling rate and the cooling rate during pressing can further decrease and the moldable time can be lengthened by further increasing the base material thickness and the weight per unit area of the resin material and further decreasing the heating temperature as compared with Example 6. Example 8 was an example in which the heating temperature was set higher and the mold temperature was set lower compared with Example 1, such that the cooling rate during pressing was increased. Example 12 was an example in which the heating temperature was set to be as high as in Example 8 and the charge time is set to be longer compared with Example 1, so that the moldable time is considerably shortened. Example 15 was an example in which a resin material having a thin base material thickness and a small base material weight per unit area as compared with Example 1 was used, such that the heating temperature was increased, the air-cooling speed and the cooling speed during pressing were increased. Although not extreme as compared with Example 15, Example 13 was an example in which a resin material having a thin base material thickness and a small base material weight per unit area was used, such that the heating temperature was increased, the air-cooling speed and the cooling speed during pressing were increased. Example 14 was an example in which the charging time was set slightly shorter and the flow stop temperature was decreased compared with Example 1, and as a result, the air-cooling rate and the cooling rate during pressing are the same as those in Example 1, but the moldable time is lengthened. In any of these examples, molded articles being excellent in moldability, weight, and appearance could be obtained.

Finally, examples in which the PBT resin (polybutylene terephthalate resin) is used as the thermoplastic resin configuring the resin material will be explained. Example 10 was an example in which the same conditions such as molding conditions and cooling conditions as those in Example 1 were adopted by using PBT as the thermoplastic resin, and a molded article having good evaluation results in moldability, weight, and appearance can be obtained. Based on Example 10, both Example 9 in which the heating temperature was set lower and the charging time was set shorter and Example 11 in which the cooling temperature during pressing was increased by increasing the heating temperature and decreasing the mold temperature can obtain a molded article having moldability, light weight and appearance that were as good as those of Example 10. Example 16 is set such that the flow stop temperature decreases and the moldable time is lengthened in the examples using PBT as the thermoplastic resin by adjusting the configuration conditions, molding conditions, and cooling conditions of the resin material. Example 17 is set such that the flow stop temperature is increased and the moldable time is shortened in the examples using PBT as the thermoplastic resin by adjusting those conditions. In any one of Examples 16 and 17, molded articles having excellent moldability, light weight, and appearance could be obtained.

Next, comparative examples will be described. Comparative Example 1 where the heating temperature was lower than the numerical range specified in the present invention was inferior in moldability and appearance. In Comparative Example 2 in which the heating temperature exceeded the numerical range specified in the present invention, exposure of the carbon fiber on the surface of the molded article was large and the appearance was inferior because of a large amount of thermal decomposition. In Comparative Example 3 in which the charge time is smaller than the numerical range specified in the present invention, molding was difficult since it was difficult to maintain the charge time practically and continuously charge on an industrial scale. In Comparative Example 4 in which the charge time exceeded the numerical range specified in the present invention, the moldable time was negative and the moldability was inferior. In Comparative Example 5 in which the pressurization time exceeded the numerical range specified in the present invention and in Comparative Example 6 in which the specified pressing pressure was set to be relatively low, the moldability time was negative and the moldability was inferior.

In Comparative Example 7 in which the base material thickness was 2.65 mm and the air-cooling rate was lower than the numerical range defined in the present invention, the weight reduction index was lower than 0.12, and the weight was inferior. In Comparative Example 8 in which the volume fraction of reinforcing fibers (Vf) was 15% and the flow stop temperature was 190° C. which is lower than the numerical range specified in the present invention, the moldability was inferior since a large burr is generated. In Comparative Example 9 in which the base material thickness of the resin material was 0.8 mm and the air-cooling rate exceeded the numerical range specified in the present invention, the moldability was inferior. In Comparative Example 12 in which the pressurization time was set to be shorter than the numerical range specified in the present invention, galling occurred, and it was difficult to continuously mold because of the breakage of the mold. In Comparative Example 13 in which the base material thickness of the resin material was 0.5 mm and the air-cooling rate exceeded the numerical range specified in the present invention, the moldability was inferior.

Finally, comparative examples in which the PBT resin (polybutylene terephthalate resin) is used as the thermoplastic resin configuring the resin material will be explained. Comparative Example 10 in which the heating temperature is 250° C. and lower than the numerical range specified in the present invention is inferior in moldability and appearance as in the case where the thermoplastic resin is nylon 6. Comparative Example 11 in which the heating temperature exceeds the numerical range specified in the present invention is inferior in light weight. In Comparative Example 14 in which the volume fraction of reinforcing fibers (Vf) was 15% and the flow stop temperature was 190° C. and lower than the numerical range specified in the present invention, burrs were generated, and it was impossible to obtain a molded article with moldability and light weight deserving an evaluation. In Comparative Example 15 in which the base material thickness of the resin material was 0.5 mm and the air-cooling rate exceeds the numerical range specified in the present invention as in the case where the thermoplastic resin is nylon 6, the moldability is inferior.

INDUSTRIAL APPLICABILITY

According to the manufacturing method of the present invention, in the method of manufacturing the fiber-reinforced resin molded article by cold press molding the fiber-reinforced resin material, the further thin-walled molded article can be obtained. The molded article is the fiber-reinforced resin molded article which has a large numerical value obtained by dividing the bending strength by the weight per unit area and is also excellent in appearance. As a result, molded articles obtained from fiber-reinforced resin materials can be used for applications, such as automobiles, aircraft, pressure vessels, which requires thin-walled molding and light weight and where metals are conventionally used, and industrial significance thereof is extremely large.

REFERENCE SIGNS LIST

1: graphs showing temperature change with time in fiber-reinforced resin material and temperature change with time at specific position of mold (upper graphs)
2: graphs showing platen position change with time and pressing pressure change with time (lower graphs)
3: temperature
4: time
5: platen position, pressing pressure
6: time
7: graph showing temperature in fiber-reinforced resin material
8: heating temperature (T) (at a time point when the temperature of the fiber-reinforced resin material reaches the highest temperature)
9: graph showing temperature at a place where shears of upper mold and shear of lower mold meet
10: time point when shears of upper mold and shear of lower mold measured from temperature abnormality meet
11: graph showing platen position
12: graph showing change of pressing pressure
13: time point when shear of upper mold and shear of lower mold measured from platen position meet
14: line where time axis of upper graph and time axis of lower graph are adjusted (time point when shear of upper mold and shear of lower mold meet is represented by reference numerals 10 and 13 which are reference points at which the time axes are adjustable)
15: time point when half of the specified pressing pressure is reached
16: platen position where fiber-reinforced resin material stops flowing
17: moldable time (tm)
18: temperature bending point
19: flow stop temperature (Tf)
31: example of schema of device where the fiber-reinforced resin material is heated by infrared oven and conveyed to mold.
32: lower mold
33: upper mold
34: thermocouple for time axis alignment
35: fiber-reinforced resin material
36: thermocouple for temperature measurement in fiber-reinforced resin material
37: thermocouple data logger
38: infrared (IR) oven
39: an arrow representing that fiber-reinforced resin material after reaching the heating temperature is moved to lower mold
40: example of schema of device at the moment shear of lower mold and shear of upper mold meet
41: example of assembly diagram of upper mold and lower mold for press molding fiber-reinforced resin material
42: Example of top view of lower mold
43: heating medium path (cartridge heater)
44: cooling medium path (water temperature control pipe)
45: shear
46: cavity height of 10 mm
47: path of thermocouple for temperature measurement in fiber-reinforced resin material
48: cavity surface in lower mold
51: installation status of resin material in lower mold cavity during moldability evaluation
52: cavity surface of lower mold (size: 210×100 mm)
53: fiber-reinforced resin material 1
54: fiber-reinforced resin material 2
55: an overlapped portion of two resin materials in size of 90×40 mm

The invention claimed is:

1. A method for manufacturing a fiber-reinforced resin molded article by cold press molding a fiber-reinforced resin material that includes reinforcing fibers and a thermoplastic resin using a mold containing an upper mold and a lower mold, the method comprising heating the fiber-reinforced resin material, the method satisfying the following a) to f) simultaneously:
   a) in the case wherein the thermoplastic resin is a crystalline thermoplastic resin, the internal temperature of the fiber-reinforced resin material immediately after heating and before molding (hereafter referred to as T or heating temperature) is in a temperature range higher than the melting point of the crystalline thermoplastic resin by 50 to 100° C. and in the case wherein the thermoplastic resin is an amorphous thermoplastic resin, the heating temperature is in a temperature range higher than a glass transition temperature of the amorphous thermoplastic resin by 125 to 175° C.;
   b) a time range (hereinafter referred to as tc, or a charge time) starting from the completion of heating of the fiber-reinforced resin material and ending the moment the fiber-reinforced resin material after heating is arranged on the lower mold is 6.0 to 35.0 seconds;
   c) a cooling rate of the fiber-reinforced resin material (hereafter referred to as C1 or an air-cooling rate) which is measured starting from the completion of the heating of the fiber-reinforced resin material and ending at the point at which the fiber-reinforced resin material that is arranged on the lower mold, is brought into contact with the upper mold is 1.0 to 6.5° C./sec;
   d) a time range (hereafter referred to as tp, or a pressurization time) starting from when the upper mold is brought into contact with the fiber-reinforced resin material and ending the moment the pressing pressure reaches a pressure of 10 to 50 MPa, is 0.1 to 2.5 seconds;
   e) in the case wherein the thermoplastic resin is the crystalline thermoplastic resin, a temperature at which the fiber-reinforced resin material stops flowing (hereafter, referred to as Tf or a flow stop temperature) is in a temperature range of 25° C. lower than the melting point of the crystalline resin to 30° C. higher than the melting point thereof and in the case wherein the thermoplastic resin is the amorphous thermoplastic resin, the flow stop temperature is in a temperature range higher than the glass transition temperature of the amorphous thermoplastic resin by 50 to 105° C.; and f) a time range (hereafter referred to as tm, or a moldable time) starting from the point at which the pressure of the press molding machine reaches half of the specified pressure after the upper mold is brought into contact with the fiber-reinforced resin material and ending at the point at which the temperature of the fiber-reinforced resin material reaches the flow stop temperature is 0.01 to 18 seconds, wherein the tm satisfies the following formula:

$$tm = \frac{T - (C1 \times tc + C2 \times 0.5 \times tp) - Tf}{C2} \quad (1)$$

in the formula (1), tm represents the moldable time, T represents the heating temperature, tc represents the charge time, C1 represents the air-cooling rate, tp represents the pressurization time, Tf represents the flow stop temperature, and C2 thereinafter referred to as C2, or a cooling rate during pressing) represents a cooling rate of the fiber-reinforced resin starting material from when the upper mold is brought into contact with the fiber-reinforced resin material and ending at when the fiber-reinforced resin material reaches the flow stop temperature.

2. The method for manufacturing the fiber-reinforced resin molded article according to claim 1, wherein, at the time of heating, the thermal decomposition rate of the thermoplastic resin configuring the fiber-reinforced resin material (hereinafter, referred to as a thermal decomposition rate) is 0.03 to 0.2 wt %/sec.

3. The method for manufacturing the fiber-reinforced resin molded article according to claim 1, wherein C2 is 1.5 to 100° C./sec.

4. The method for manufacturing the fiber-reinforced resin molded article according to claim 1, wherein the moldable time is 0.2 to 10.0 seconds.

5. The method for manufacturing the fiber-reinforced resin molded article according to claim 1, wherein the reinforcing fibers are a mixture of single-fiber bundles having different numbers of single fibers.

6. The method for manufacturing the fiber-reinforced resin molded article according to claim 1, wherein the reinforcing fibers are carbon fibers and a weight average fiber length of the carbon fibers is 1 to 100 mm, and a ratio of reinforcing fiber bundles (A) composed of carbon single fibers of equal to or more than a critical single fiber number defined by the following Formula (2) to a total amount of the reinforcing fibers is 20 to 99 vol %.

$$\text{Critical single fiber number} = 600/D \quad (2)$$

wherein D is the average single fiber diameter (μm) of the reinforcing fibers.

* * * * *